May 7, 1957   J. T. PENNINGTON   2,791,151
METHOD OF AND APPARATUS FOR AEROTRIANGULATION
WITH CONVERGENT PHOTOGRAPHY
Filed May 6, 1953   13 Sheets-Sheet 4
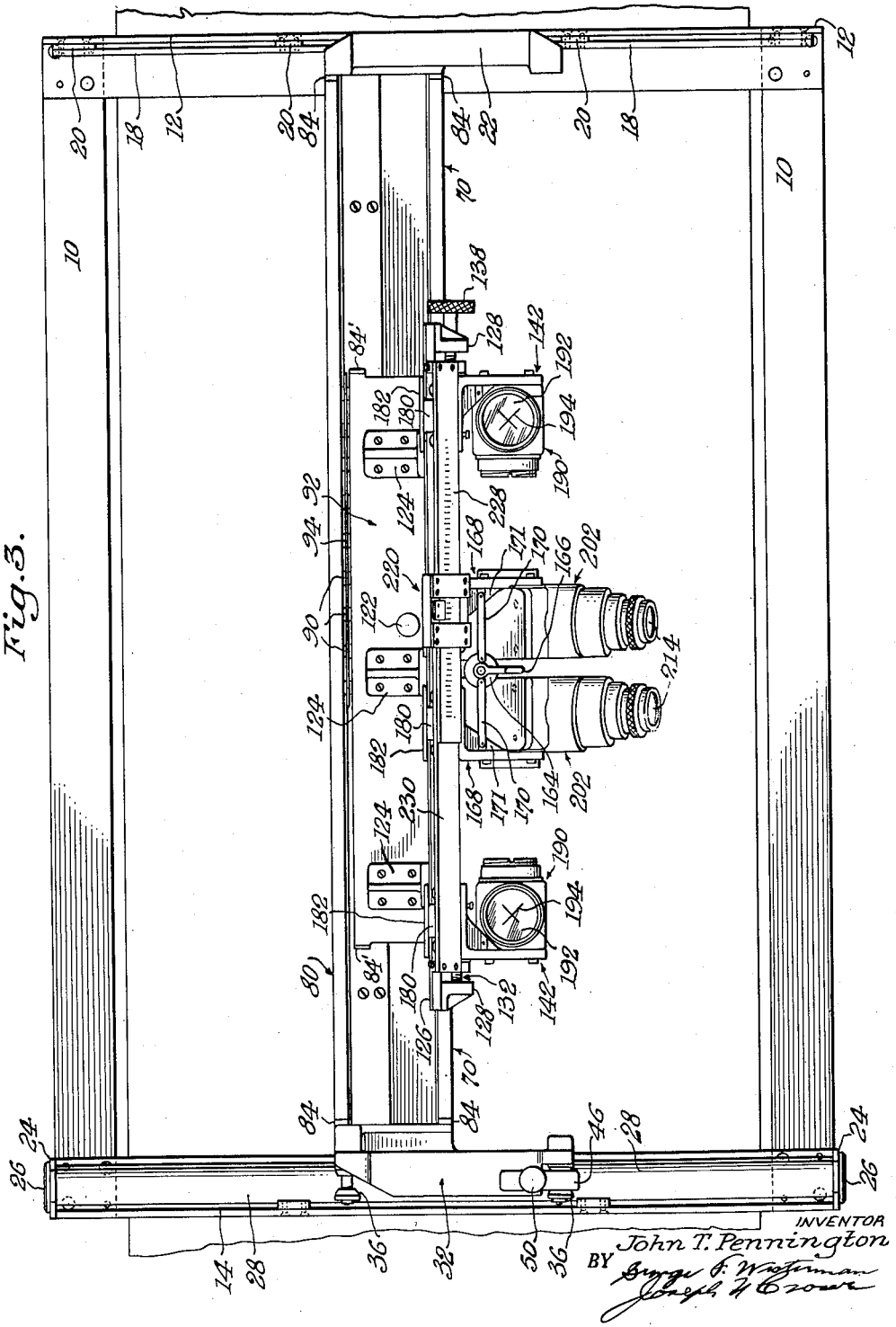
INVENTOR
John T. Pennington
BY
ATTORNEYS

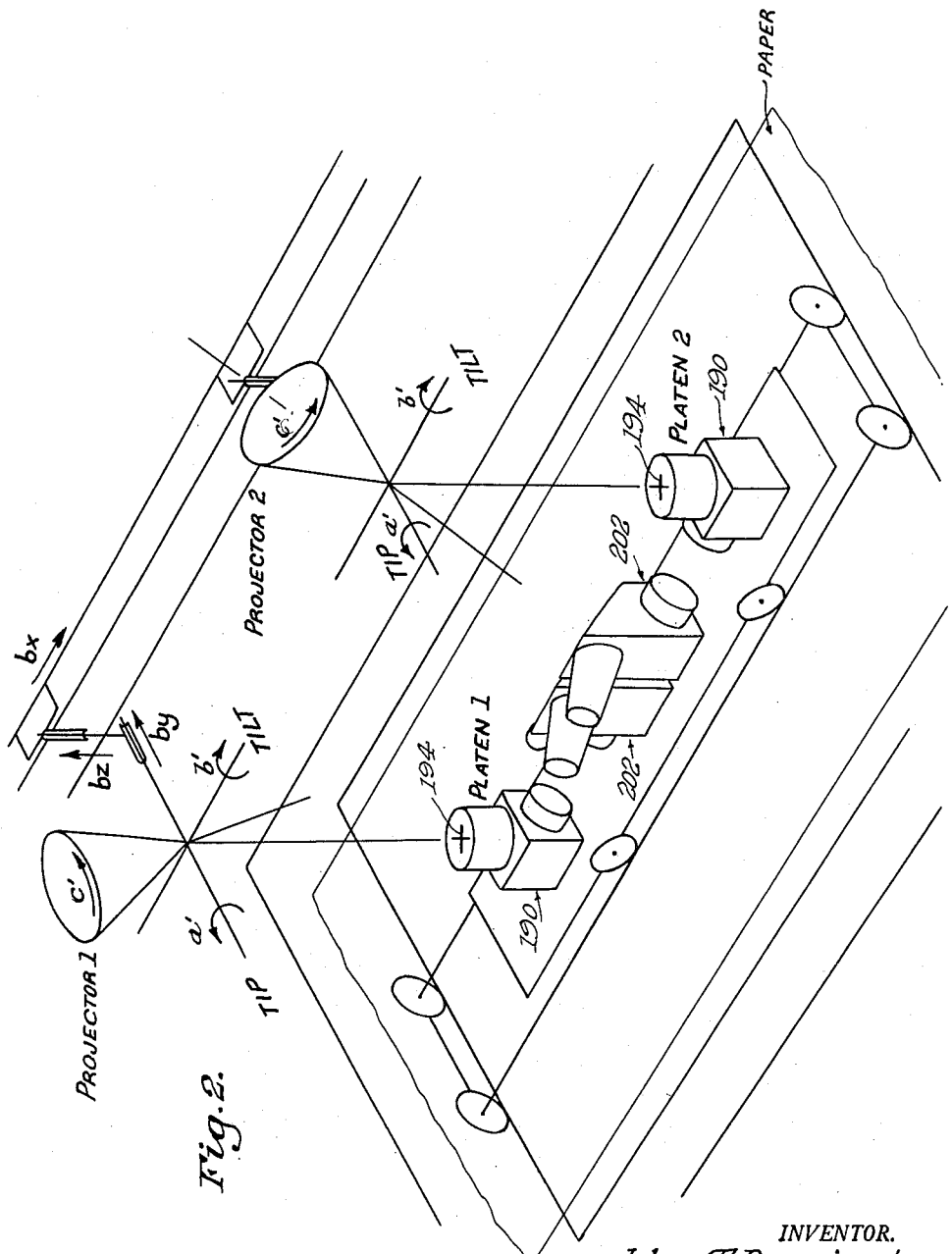

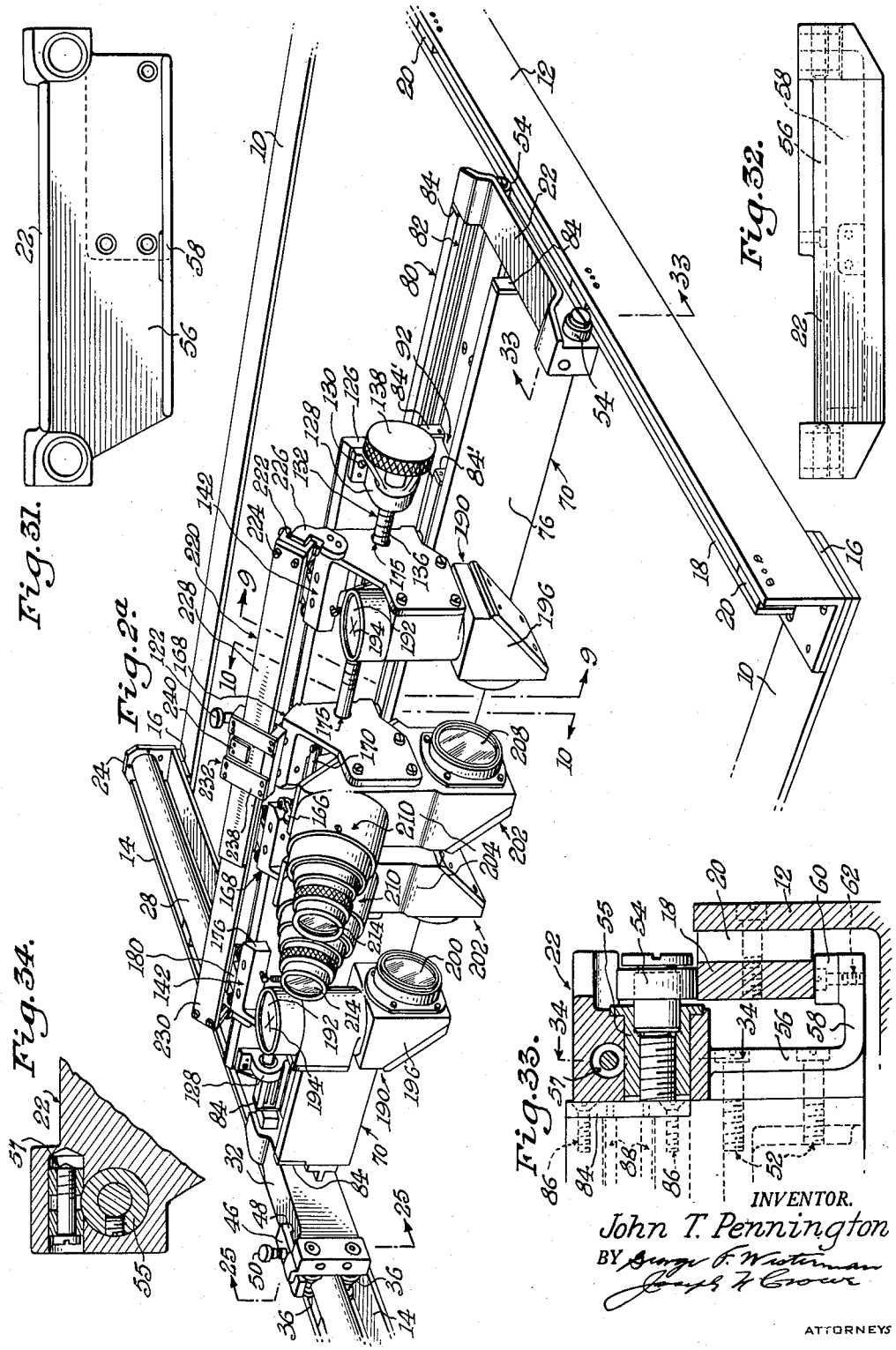

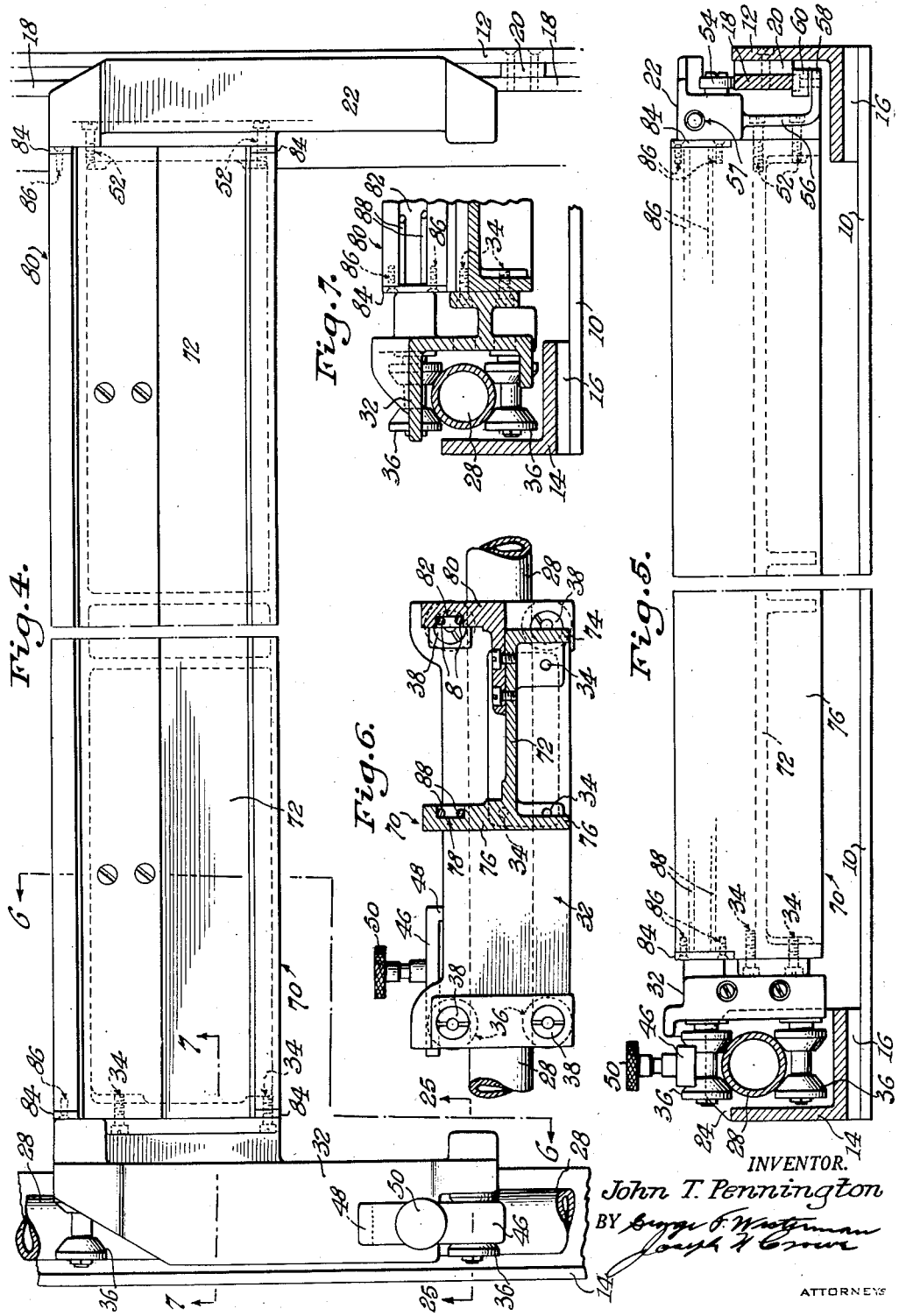

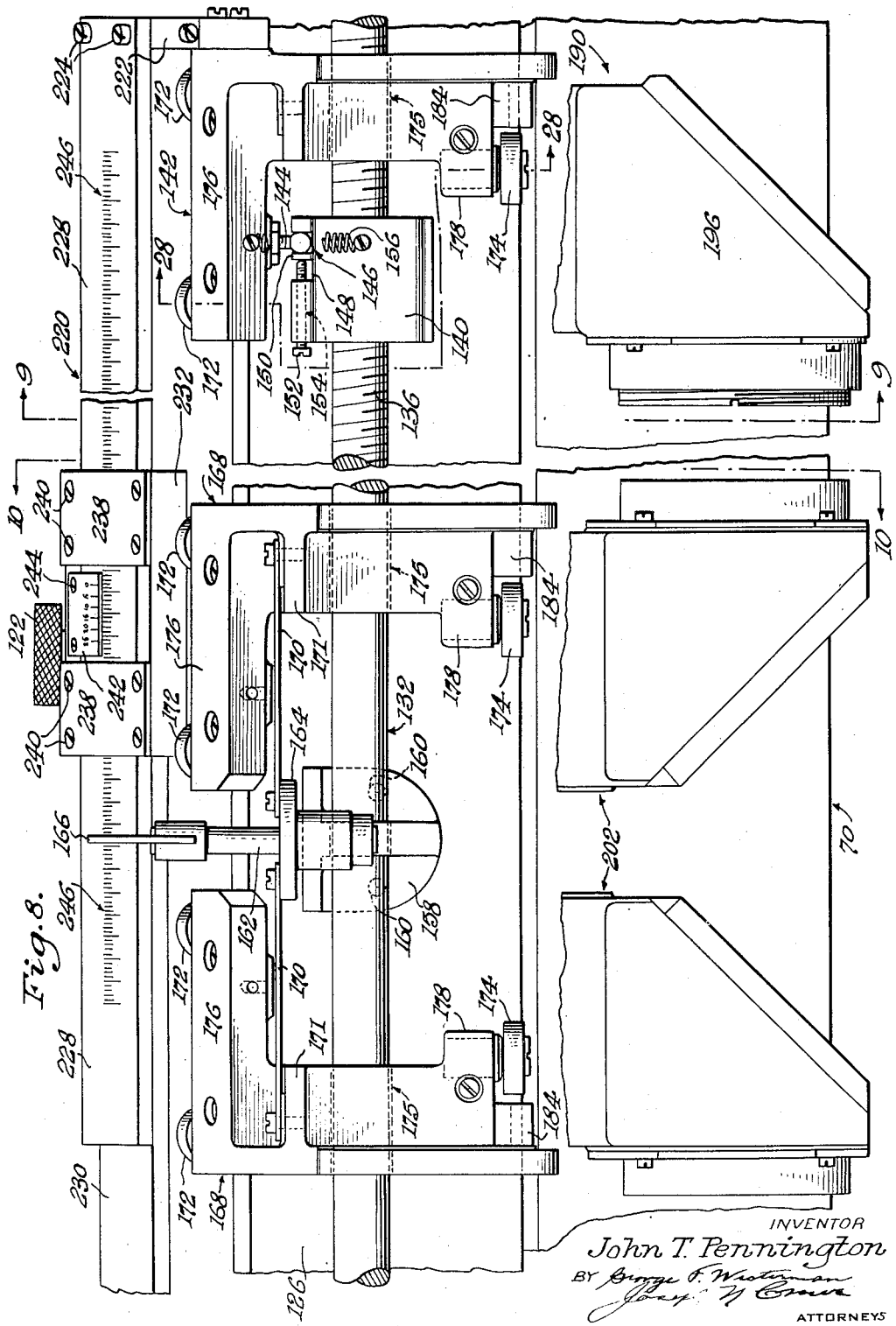

May 7, 1957  J. T. PENNINGTON  2,791,151
METHOD OF AND APPARATUS FOR AEROTRIANGULATION
WITH CONVERGENT PHOTOGRAPHY
Filed May 6, 1953  13 Sheets-Sheet 7
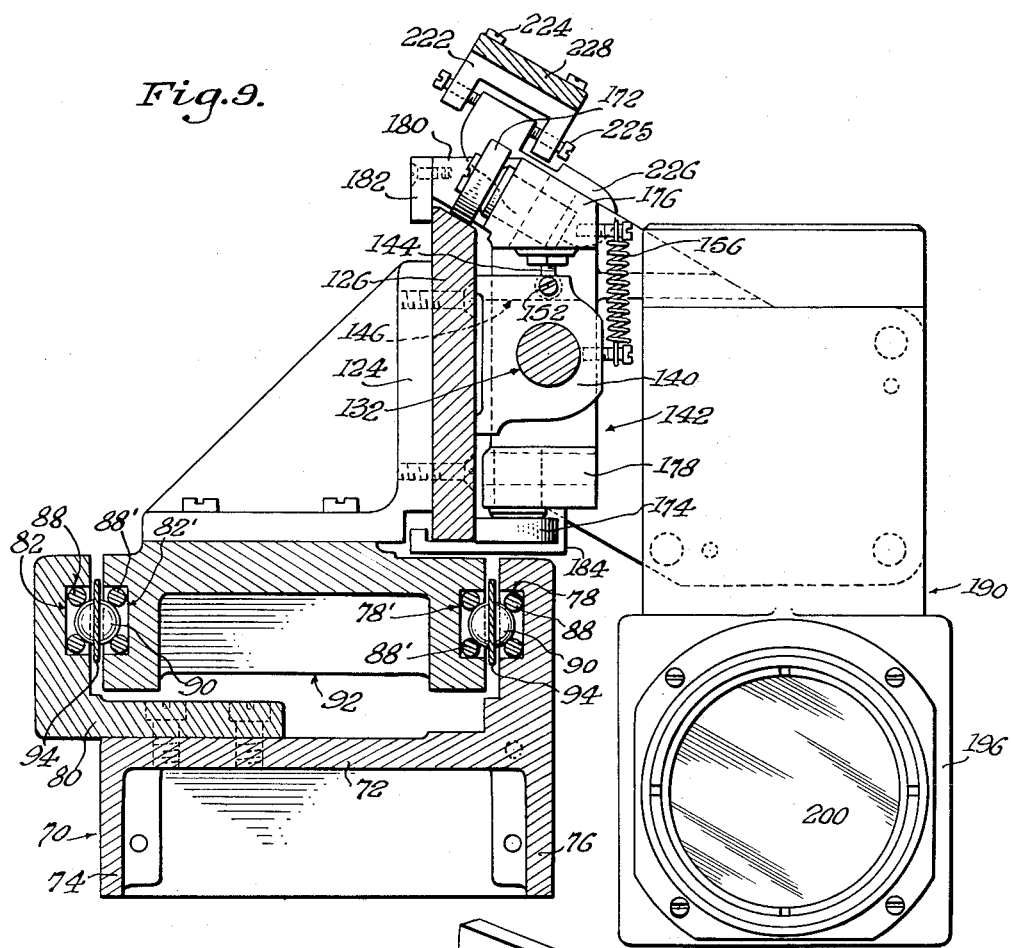
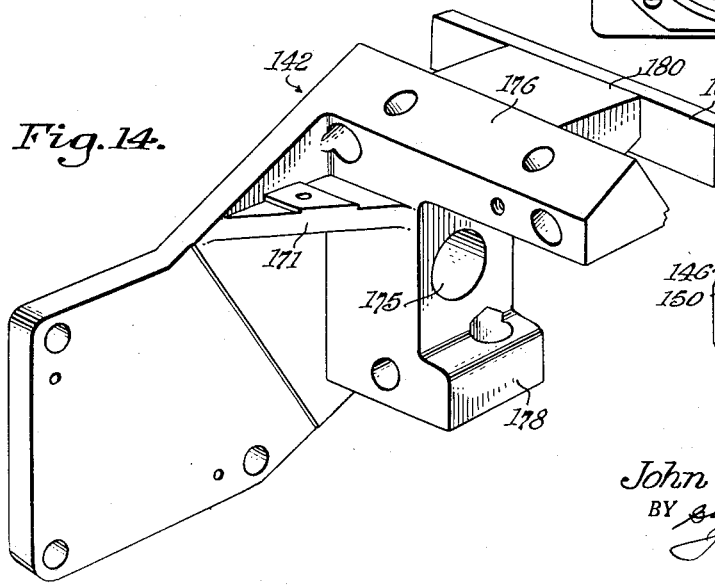
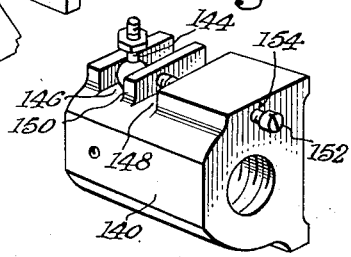
INVENTOR.
John T. Pennington
BY
ATTORNEYS May 7, 1957  J. T. PENNINGTON  2,791,151
METHOD OF AND APPARATUS FOR AEROTRIANGULATION
WITH CONVERGENT PHOTOGRAPHY
Filed May 6, 1953  13 Sheets-Sheet 8

INVENTOR.
John T. Pennington
BY
ATTORNEYS

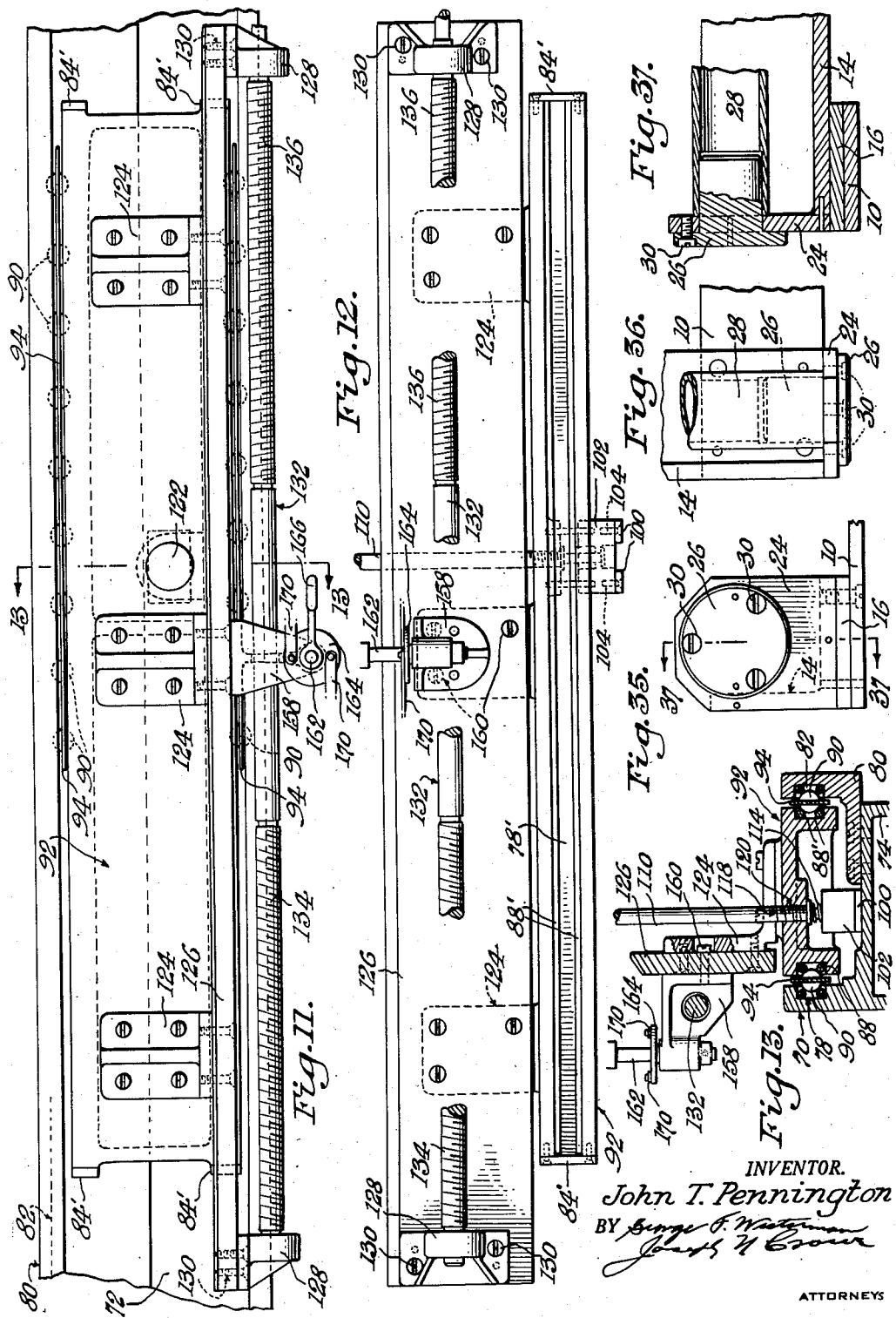

May 7, 1957 J. T. PENNINGTON 2,791,151
METHOD OF AND APPARATUS FOR AEROTRIANGULATION
WITH CONVERGENT PHOTOGRAPHY
Filed May 6, 1953 13 Sheets-Sheet 10
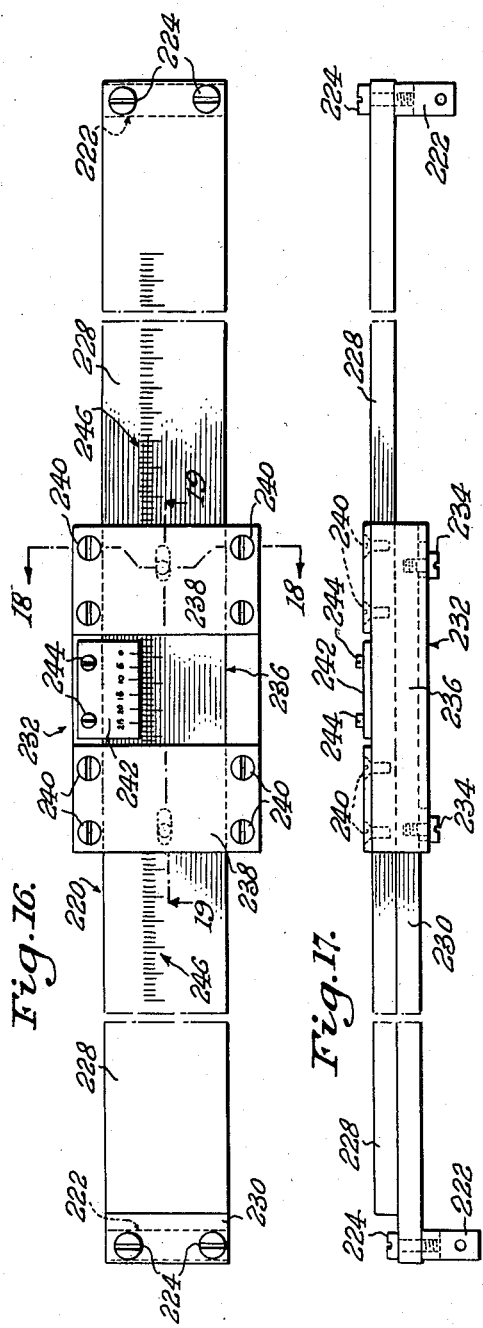
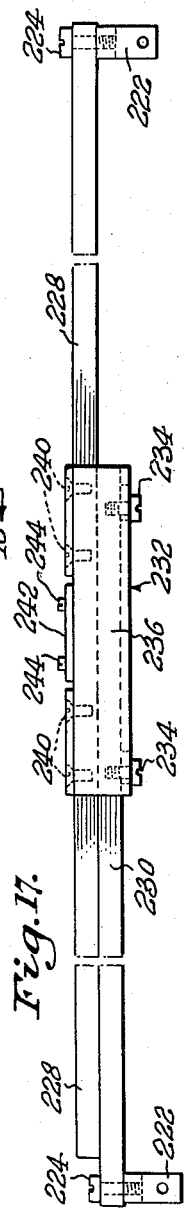
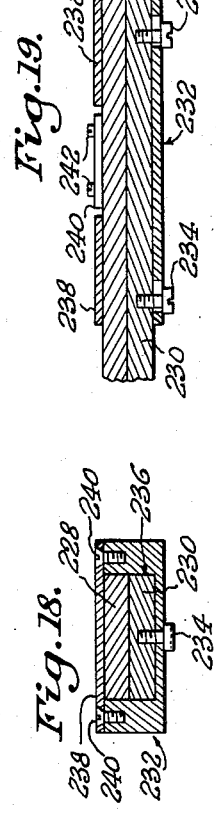
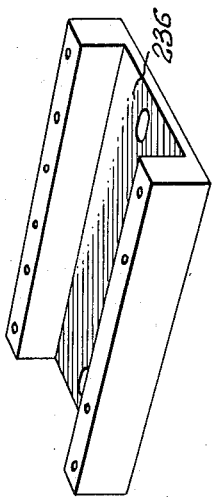
INVENTOR.
John T. Pennington
BY
ATTORNEYS

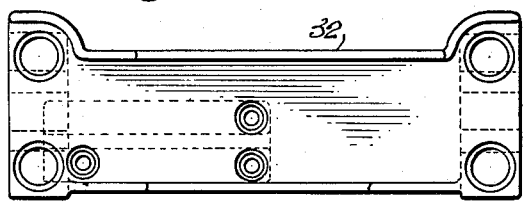
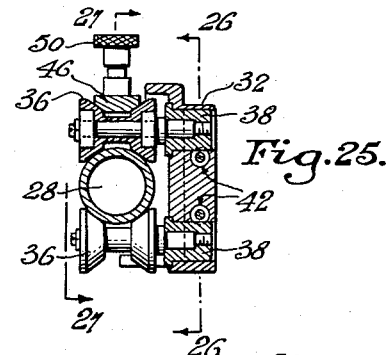
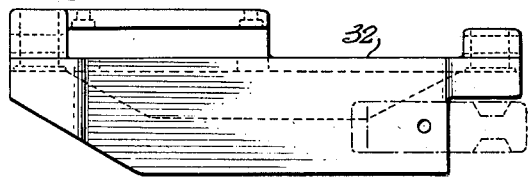
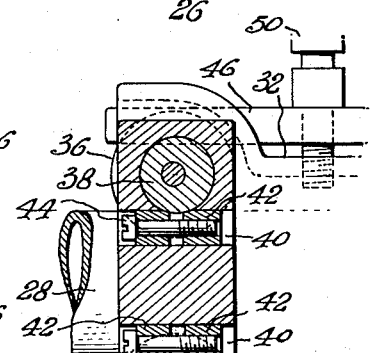
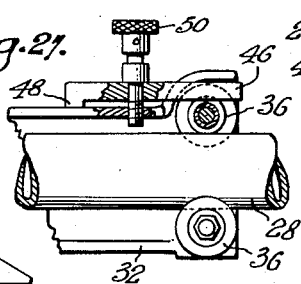
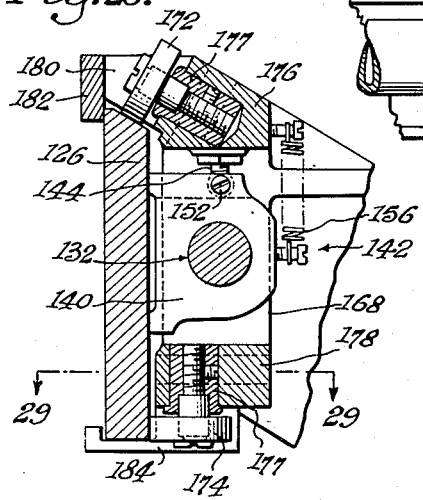
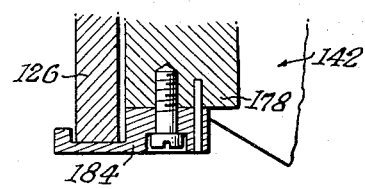
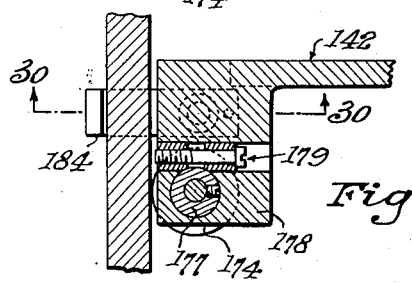

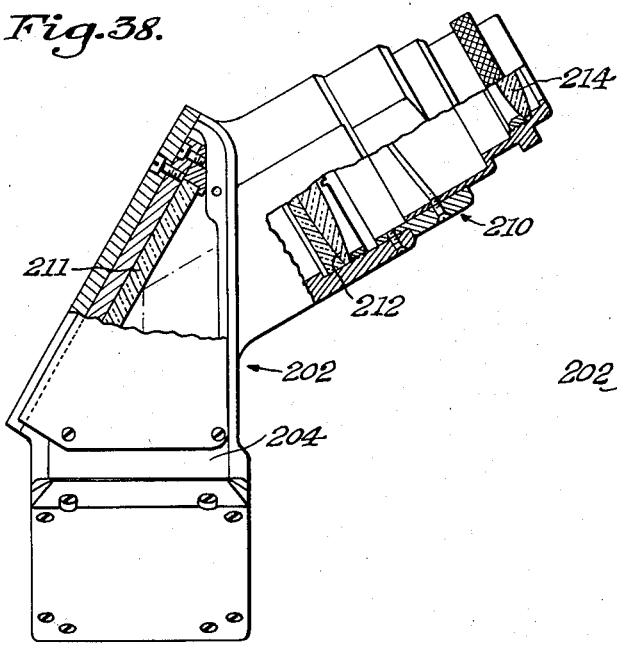
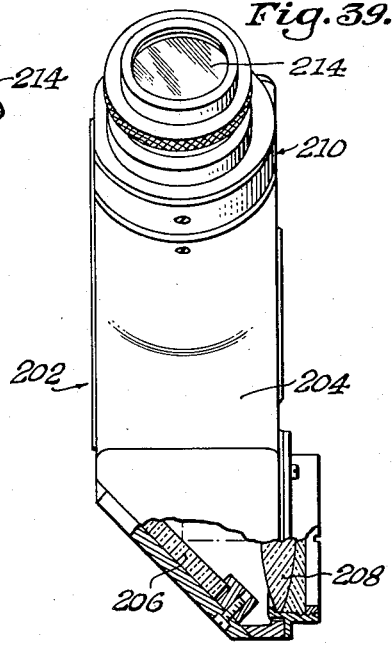
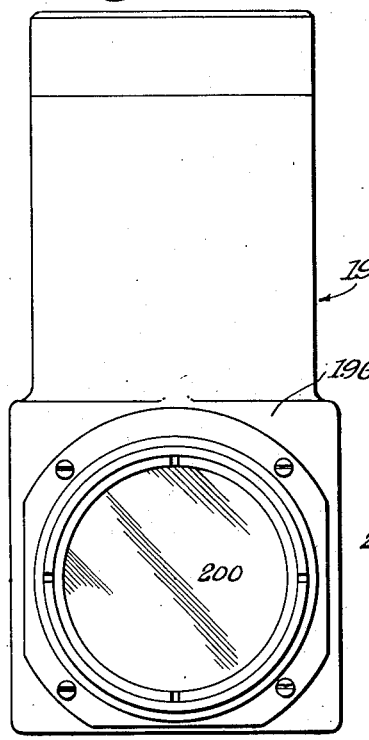
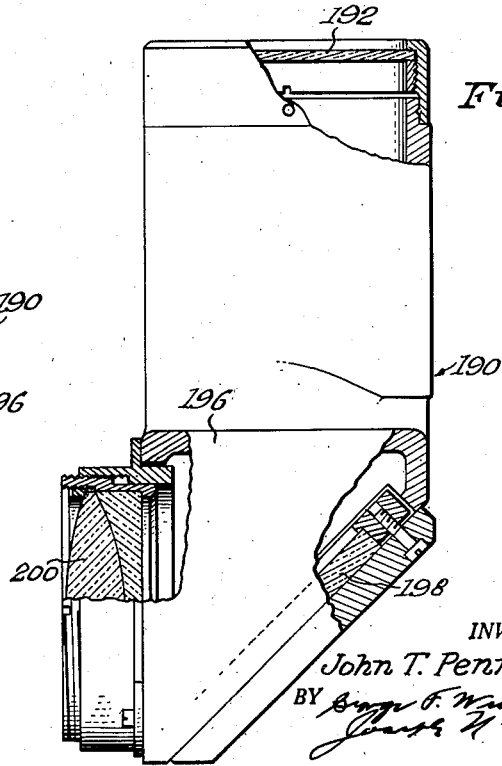

May 7, 1957  J. T. PENNINGTON  2,791,151
METHOD OF AND APPARATUS FOR AEROTRIANGULATION
WITH CONVERGENT PHOTOGRAPHY
Filed May 6, 1953  13 Sheets-Sheet 13

*Fig. 42.*

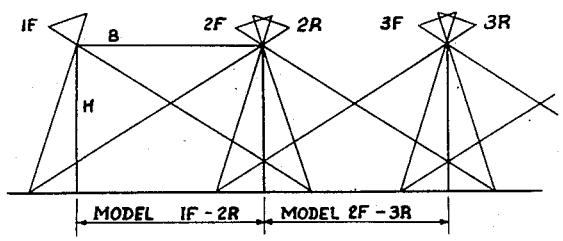

F = FORWARD SHOOTING CAMERA
R = REAR SHOOTING CAMERA

*Fig. 43.*  PROCEDURE  *Fig. 44.*

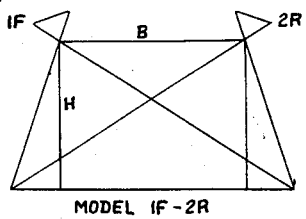
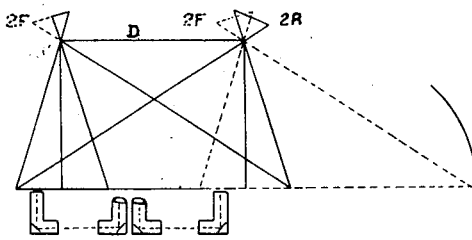

STEP 1
1. ORIENT MODEL IF-2R TO GROUND CONTROL
2. RECORD POSITION AND ELEVATION OF PASS POINTS.

STEREOPONTOMETER MODEL 2F-2R
STEP II
1. REPLACE IF WITH 2F
2. HOLD ORIENTATION OF 2R PROJECTOR AND ADJUST 2F PROJECTOR RELATIVE TO 2R PROJECTOR

STEP III
1. REPLACE 2R WITH 3R
2. HOLD ORIENTATION OF 2F PROJECTOR AND ADJUST 3R PROJECTOR RELATIVE TO 2F PROJECTOR
3. SCALE TO PASS POINTS ESTABLISHED IN THE FIRST MODEL IF-2R
4. ORIENT REMAINING MODELS AS OUTLINED ABOVE

INVENTOR.
John T. Pennington
BY
ATTORNEYS

United States Patent Office 2,791,151
Patented May 7, 1957

2,791,151

METHOD OF AND APPARATUS FOR AEROTRI-ANGULATION WITH CONVERGENT PHOTOGRAPHY

John T. Pennington, Alexandria, Va.

Application May 6, 1953, Serial No. 353,454

14 Claims. (Cl. 88—24)

(Granted under Title 35, U. S. Code (1952), sec. 266)

The invention described herein may be manufactured and used by or for the Government for governmental purposes, without payment to me of any royalty thereon.

The present invention relates to improvements in existing methods and equipment employed for making aerial surveys, in which there is utilized a plurality of image-projecting or carrying cameras for survey and reproduction. The invention relates particularly to topographic surveying and mapping by means of stereophotographs of any description, that is to say, by means of stereophotographs of any size, focal length, and direction of exposure obtained by means of any known system, such as projection of ray intersection, stereoscopy, or any other means known to the art. However, the present invention achieves the surveying in a substantially simpler manner than has been employed heretofore, and utilizes high-precision equipment of simple design and construction which enables the attainment of high accuracy in results substantially more conveniently and expeditiously than has been possible heretofore.

In the surveying and reproduction of terrain, that is, areas of the earth's surface, to which art the present invention relates as has been indicated above, prior practices include taking photographs from an aircraft at certain distances apart, which photographs partly overlap, so that each successive pair of films or plates constitutes a steroscopic photograph of the territorial area photographed on the two plates. These stereoscopic pictures are placed in a stereoscope and the rays are caused to intersect in pairs in such a manner that the totality or integration of the intersections develops an optical model of the photographed territorial area, from which model a map can be drawn, or a relief model of the section of the territory can be produced. This method encounters substantial difficulties because the pictures usually are taken at high elevations which practically amount to infinite distance, and in the reproduction, that is, the formation of the optical model, the complementary rays must be caused to intersect over the drawing or survey table. The present invention overcomes the above-referred to difficulties to a very substantial extent, as will become apparent hereinafter.

In the devices heretofore known and intended for the same purpose as the present invention, the optical laws holding true in geometric optics and the linear ratio of magnifications as used for single projections, for example, in the magic lantern and moving picture projection, have been transferred to double projection; and this has resulted in serious inconvenience in using the known devices, which inconvenience the present invention eliminates.

Heretofore, in order that the necessary overlap of the pictures was arrived at without the limit of solution of the grain of the plates being exceeded, two methods have been employed, namely:

(1) Optical means, such as mirrors, prisms, and intermediate optic arrangements, have been interposed so as to deflect the ray, which brought the plates into an unnatural position. In this way the cameras are prevented from interfering with each other, but otherwise the set so obtained is heavy and expensive and liable to substantial error; the intermediate members cause sensible losses of light and the external orientation of the plates is very inconvenient and tedious.

(2) The distance between the two cameras (projection base) has been so large that it was practically impossible to handle them. The large projection base also caused all the rest of the apparatus and the separation of the planes of sharp projection to be inadmissibly large. The projections were so dark that very powerful and strongly heating lamps were necessarily used which produced conditions destructive of accuracy. Another serious inconvenience of the large projection base is that the grain of the plates is also magnified whereby the accuracy of measurement is substantially impaired.

Defective accuracy and serious uneconomical factors in manufacture and operation constitute the main reasons for the only occasional use of the known expensive apparatus and awkward procedures attending the use of such apparatus and for the failure of topographical surveying by means of stereoscopic pictures taken from aircraft and the making of optical models therefrom to emerge from the experimental stage. Efforts made previously to the present invention to obviate the previously encountered objections and difficulties have been at best only partially successful and leave much to be desired in the expeditious and economical attainment of the desired and needed objectives.

As has been noted above, the present invention obviates the previously encountered difficulties in this art. Generally speaking, it is the principal object of the present invention to overcome the disadvantages encountered in the construction and use of the previously available equipment, and to provide appartus, particularly, dual aerial camera equipment and a double projector, for stereoscopic photographing and projecting which operates with the greatest accuracy, which is relatively inexpensive to manufacture, and which is economical and easy to operate.

More particularly, a further object of the present invention is to provide apparatus and a procedure for topographic mapping from aerial photographs, in which apparatus the photographs utilized are taken from a twin camera installation of simple construction which obviates complex and heavy prior constructions in which, as has been a requisite in previous equipment, the angle of tilt of the camera installation is required to be known to a high degree of accuracy, the only basic requirement in carrying out the present invention being that the camera installation employed will produce sufficient overlap between the photographs taken by each of the cameras to produce a stereoscopic image or model through the use of improved equipment for obtaining such a model, which equipment is encompassed within the scope and objects of the present invention.

A further object of the invention in line with the foregoing is to provide an apparatus whereby conventional double or twin projector instrumentalities may be utilized in the obtaining of stereoscopic images or models from a simplified twin camera installation, thereby eliminating the requirement for a high-precision, mechanically adjusted twin projector instrument heretofore required for accurately reproducing the exact position of the twin camera installation at the moment of exposure of the photographic film or plate.

A still further object of the invention is to provide a method for bridging control between convergent oblique photographs of a number of observation stations, which can be applied to the use of any instrument utilizing only two projectors, thereby eliminating any necessity of providing a large bank of projectors.

A still further object of the invention is to provide a method for bridging control utilizing the overlap common to succeeding pairs of stereoscopic photographs or models.

Further objects of the invention will become apparent as the description proceeds, and the features of novelty will be pointed out in particularity in the appended claims.

In connection with the foregoing objects, it may be noted that prior to the present invention, it has been the usual practice in stereophotogrammetric mapping operations to utilize serial strip vertical photography in which succeeding photographs in the serial strip overlap each other by approximately sixty percent. However, instead of vertical photographs, alternate vertical and oblique exposures have been used to a limited extent to take advantage of the increased area covered through the overlapping pair, which increased area may be approximately twice that obtained with vertical serial strip photography, but even with the use of alternate vertical and oblique photographs, there is insufficient overlap between succeeding stereoscopic models to effect a tie between such models as would be necessary to bridge between widely spaced ground control points. More recently, it has been proposed that serial strip convergent oblique photographs taken with a twin camera installation of very complex construction for utilization in projectors of great complexities be used, but the cost of these machines has made their use largely prohibitive. The present invention is intended to replace such complicated and costly equipment as has been noted above as one of the objects of the present invention.

Before entering into a detailed description and explanation of the present invention, it may be noted that the invention makes use of a basic principle that any object when photographed from different points will appear to be placed differently with respect to other objects shown in the photographs; and in the description of the principle and operation of the invention which will be set forth hereinafter, it will be assumed that aerial photographs taken from different points are employed in pairs, the photographs having adequate overlapping areas, each photograph of the first pair showing readily identifiable objects the exact location in space of which are known, or which can be ascertained in any known way, as well as having other known or readily obtainable characteristics such as height or other dimensions, physical appearance and the like, which objects serve as reference points, each succeeding pair of photographs containing these same objects or other additional objects, the exact locations in space of which are desired, and which, being in the area of overlap of the successive photographs, serve as pass points. Such a series of pairs of photographs are known as serial strip convergent photographs. It is evident that because of variations in ground elevations and, in the case of aerial photographs, because of tilting of the cameras because of unsteady flight of the airplane engaged in the photographic operations, as well as from other causes, the photographs themselves will give a distorted view of the terrain, and such photographs when placed in juxtaposition for stereoscopic viewing, are of different scales. All of these factors necessitate corrections for such distortions and also a coordination of the series of pictures using the one containing as reference points the aforesaid objects of known spatial position as a reference for the remaining pairs of photographs. The procedure perfecting this coordination of the photographs is referred to as "bridging control." As has been pointed out above, the present invention provides an improved method of effecting this bridging control and a simplified apparatus for carrying out the improved method.

Reference now may be made to the accompanying drawings, in which:

Fig. 2 is a diagrammatic assembly view of an improved apparatus forming a part of the present invention and used in the practice thereof;

Fig. 2a is a perspective view of an improved photogrammetric stereopontometer which may be used in the practice of this invention;

Fig. 3 is a plan view of the photogrammetric stereopontometer of Fig. 2a;

Fig. 4 is a plan view of the main supporting frame of this equipment and its carriages;

Fig. 5 is a side elevation, parts being shown in section, of the main supporting frame and carriages shown in Fig. 4;

Fig. 6 is a sectional view of the main supporting frame taken along line 6—6 of Fig. 4;

Fig. 7 is a sectional view of the left carriage for the main supporting frame taken along line 7—7 of Fig. 4;

Fig. 8 is an enlarged fragmentary front elevation of the stereopontometer, showing the platen and binocular mounting brackets;

Fig. 9 is a vertical transverse sectional view of the stereopontometer taken along line 9—9 of Figs. 2a and 8;

Fig. 11 is a plan view of the stereoscope supporting frame;

Fig. 12 is a front elevation of the stereoscope supporting frame;

Fig. 13 is a vertical sectional view of the stereoscope supporting frame, taken along line 13—13 of Fig. 11;

Fig. 14 is a perspective view of one of the brackets used for supporting the platen units and binoculars;

Fig. 15 is a perspective view of a nut utilized for spacing the platen units;

Fig. 16 is a plan view of the platen spacing scale, also shown in perspective in Fig. 2a;

Fig. 17 is a front elevation of the platen spacing scale;

Fig. 18 is a transverse sectional view of the platen spacing scale, support and guide taken along line 18—18 of Fig. 16;

Fig. 19 is a longitudinal sectional view of the platen spacing scale, support, and guide, taken along line 19—19 of Fig. 16;

Fig. 20 is a perspective view of the scale support and guide;

Fig. 23 is an end elevation of one of the main supporting frame carriages;

Fig. 24 is a plan view of the main supporting frame carriage shown in Fig. 23;

Fig. 25 is a detailed sectional view of the main supporting frame carriage, the section being taken along line 25—25 of Figs. 2a and 4;

Fig. 26 is an enlarged detailed sectional view of the main supporting frame carriage roller mounting eccentrics, the section being taken along line 26—26 of Fig. 25;

Fig. 27 is a detailed sectional view of the main supporting frame carriage brake, the section being taken along line 27—27 of Fig. 25;

Fig. 28 is a detailed sectional view of the platen bracket roller mounting eccentrics, the section being taken along line 28—28 of Fig. 8;

Fig. 29 is a horizontal sectional view of the platen bracket roller mounting eccentrics, the section being taken along line 29—29 of Fig. 28;

Fig. 30 is a detailed vertical sectional view of the bracket retaining guide, the section being taken along line 30—30 of Fig. 29;

Fig. 31 is an end elevation of the right main supporting frame carriage shown in perspective on the right side of Fig. 2a;

Fig. 32 is a plan view of the main supporting frame carriage of Fig. 31;

Fig. 33 is a sectional view of the main supporting frame carriage, the section being taken along line 33—33 of Fig. 2a;

Fig. 34 is a detailed sectional view of the main supporting frame carriage roller mounting eccentrics, the sections being taken along line 34—34 of Fig. 33;

Fig. 35 is a detailed end view of the tubular track mounting;

Fig. 36 is a plan view of the tubular track mounting shown in Fig. 35;

Fig. 37 is a vertical detailed sectional view of the tubular track mounting, the section being taken along line 37—37 of Fig. 35;

Fig. 38 is a side elevation, parts being broken away and shown in section, disclosing details of one eyepiece;

Fig. 39 is a front elevation, parts being broken away and in section, disclosing details of one eyepiece;

Fig. 40 is a front elevation of one of the platen housings;

Fig. 41 is a side elevation of one of the platen units having parts being broken away and in section, disclosing details of one of the platen units;

Fig. 42 is a diagrammatic view showing the production of stereoscopic models from the convergent serial strip photographs taken in accordance with Fig. 1;

Figure 1:
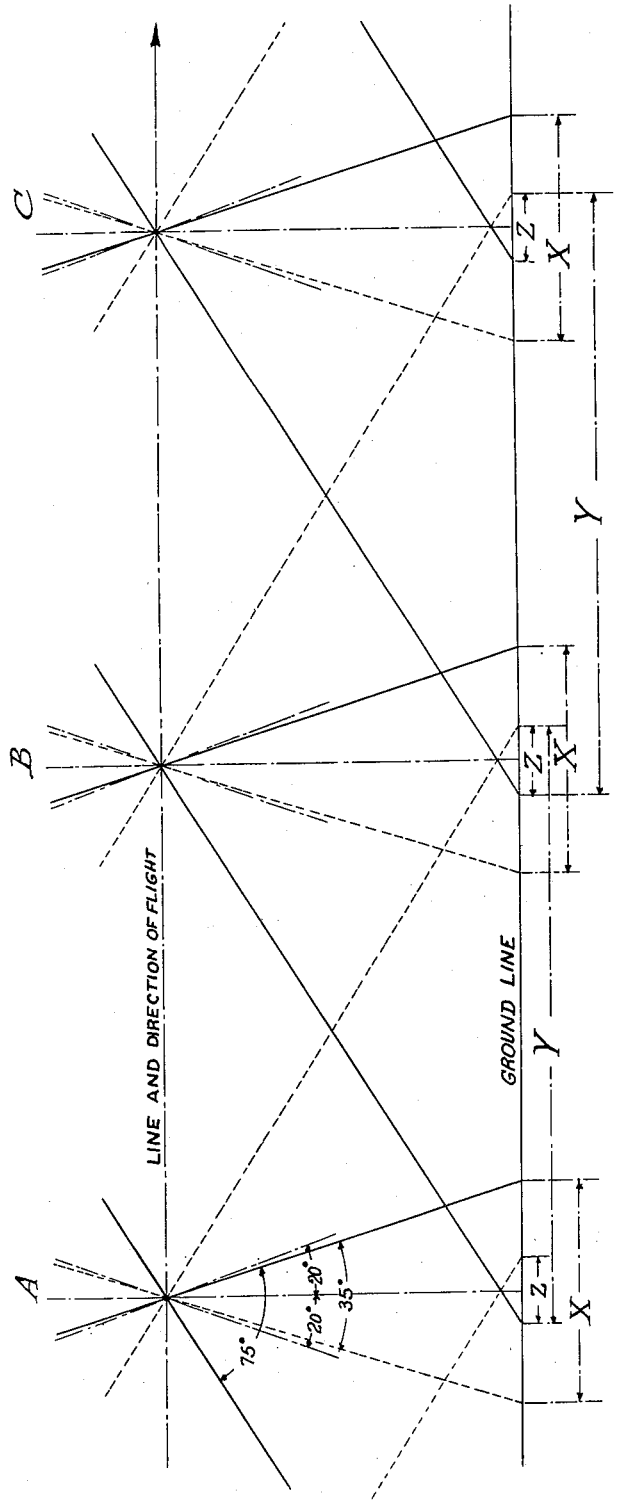
Fig. 1 is a diagrammatic showing of the taking of convergent serial strip photographs, with a wide angle twin camera apparatus, of a series of stations along a line of flight, the cameras photographing overlapping areas of terrain adjacent to the stations.

Fig. 43 is a diagrammatic view showing the first step in the production of a stereoscopic model utilizing the improved method of bridging control of the present invention; and Fig. 44 is a diagrammatic view illustrating the second and third steps in the production of stereoscopic models in accordance with the present invention, utilizing the projectors and viewing equipment illustrated in Fig. 2, the procedural steps being shown with the assistance of self-explanatory legends, Figs. 42, 43, and 44 being intended to be considered conjointly with reference to both Fig. 2 and to Fig. 1, and particularly with reference to Fig. 1.

Before proceeding with a detailed description of the accompanying drawings and the improvements of the present invention illustrated thereby, it may be pointed out that within certain limits, a stereoscopic view or model of any subject may be obtained by fusing two pictures of the subject taken from different viewpoints so that each eye will see but one view. However, this view or model is generally not a true-to-scale reproduction of the subject. Each picture is a perspective view of the subject, the camera lens being the center of perspective. In order to have a true perspective view, the taking lens must be without distortion, or the picture must be viewed through the taking lens or a lens exactly like it as to shape, position, and location. Assuming two true perspective views, to obtain a correct stereoscopic model the two views must be fused with exactly the same angular relationship as occurred in nature when the pictures were taken. Practically, this means the taking positions and orientations of the two pictures must be recovered. For aerial photographs this is not possible by any system of direct measurement.

A true stereoscopic model can be formed from two correct perspective views if the pictures can be projected from the same or similar cameras, so that all rays from corresponding picture points intersect in space. To do this with certainty and to obtain a model that can be used for mapping, the following requirements must be fulfilled:

1. A stable original negative, on glass plate or good film.

2. Projection from an exact duplicate of the taking camera or from an exact reduction or enlargement of the taking camera; in the latter case the same reduction or enlargement of the photograph must be made.

3. A precise method of orienting the two projections, both relatively and absolutely, relative orientation being defined as orientation of one projector with reference to another to produce the relative relationship of the taking cameras. Two adjacent projectors are relatively oriented when all rays from one intersect corresponding rays from the other. Absolute orientation is defined as orientation of two or more projectors to give a stereoscopic model having correct scale and horizontalization. This matter of orientation, both relative and absolute, of the projectors employed in the present procedure will be referred to again hereinafter.

4. A method of viewing the double projection without changing this orientation.

5. A method of measuring the stereoscopic model.

In carrying out the present procedure photographs are employed which have been taken in the manner hereinafter described by the use of film cameras complying with the requirements of a precision camera. These photographs may be reduced in size and made into positives, which may be either transparencies or opaque, depending on the type of projector to be employed, so that they may be used in projectors of small size. The projectors may be visualized as replicas of the taking cameras, so placed along a horizontal bar as to be in the same relative positions occupied by the camera when each picture was taken. Rays from adjacent projectors intersect to form images in the same relative positions they occupied on the terrain. These images are viewed stereoscopically, measurements are made in the stereoscopic model, and the detail in the model is compiled into a conventional map on paper.

In carrying out the present invention it will be understood that a pair of cameras is mounted on an aircraft and operatively connected for simultaneous actuation so as to produce photographs of terrain to be mapped, taken simultaneously by the two cameras of the pair, one of which cameras being directed forwardly of the aircraft and in the direction of the line of flight of the aircraft, the other camera of the pair being directed in the opposite direction, that is, rearwardly of the aircraft and of the line of flight, the former camera taking a forward oblique view of an area of the terrain being mapped, the latter camera taking a rear oblique view of the ground surface within range or view of this latter camera. As the flight of the aircraft progresses over the said terrain, a series of such exposures will be made, each exposure being a forward oblique view of the terrain and a rear oblique view thereof, the exposures being made at such time intervals that the rear oblique view taken at the instant of exposure of the plates or films in the two cameras will overlap to a substantial extent the precedingly made forward exposure, so that the successive pictures always will show a substantial overlapping area of the terrain, which area is common to the forward oblique view taken by previous exposure and the rear oblique view taken by the succeeding exposure. The sequential exposures are taken at such time intervals that will be necessary to cover the entire terrain to be mapped while preserving a substantial overlapping area common to the forward oblique view of one exposure and the rear oblique view of the immediately succeeding exposure. It will be understood that the operation of the camera shutters is timed to operate automatically at constant selected distance of flight of the aircraft and also so that the angle of directional slope from the respective cameras for each exposure will be the same; and the distance between the succeeding points of exposure has to be so selected that the resulting series of photographs will have a common area of overlap, that is, the photographs of each station have areas or amounts by which one photograph overlaps the area covered by another, which amount of overlap is expressed customarily as percentage. The resulting exposures are developed, and positives made therefrom which are assembled in a pair of projectors which are employed to produce true stereoscopic models of the overlapping areas. The present procedure uses two projectors regardless of the number of stations photographed from the aircraft. If the line of flight of the aircraft were steady, the orientation of the projectors would be simplified, but the said flight will be unstable with respect to one or more factors or conditions producing distortions of the resulting photographs. Such variations result from tilting, tipping, or swinging of the aircraft relative to the terrain being photographed, as well as variations of its line of flight above the ground line. Since the production of true stereoscopic models depends upon exact relative positioning of the projectors to duplicate the positions of the cameras at the instant of making the exposures, orienting corrections of the projectors must be made so that such variations in camera relationships may be corrected and the overlapping areas of the succeeding photographs will be brought into true stereoscopic orientation or relationship. The viewing device of the present invention greatly facilitates the exact production of true stereoscopic models.

As has been pointed out above, the present invention makes use of the basic principle that an object when photographed from different points will appear differently placed with respect to other objects also shown in the photographs, and is especially useful in preparing maps from data supplied by photographs taken from aircraft in flight. Accordingly, in the description of the principle and operation of the invention, it will be assumed that aerial photographs taken from different locations are employed in pairs, each photograph of the first pair showing objects to serve as reference points, the exact location of which in space are known or which can be ascertained in any known way, and each succeeding pair containing identifiable objects the exact location of which in space are desired and which are designated as "pass points," such a series of pairs of photographs being known to the art as "serial strip convergent photography." It is believed to be apparent that because of variations in ground elevations, and, in the case of aerial photography, tilting of the cameras by the unsteady flight of the airplane, and other phenomena, the photographs will give a distorted picture of the terrain, and such pictures also likely will be of different scales so that when they are placed in juxtaposition for producing stereoscopic models, will require corrections for these distortions and a coordination of the series of pictures using the one containing objects of known spatial position as a reference for the remaining pairs of photographs. The procedure perfecting this coordination of the photographs has become known to the art as "bridging control," and, as has been pointed out above, it is for a new method of bridging control and an apparatus for carrying out this method that this invention is specifically directed.

In the past it has been the usual practice in stereophotogrammetric mapping procedures to utilize serial strip vertical photography in which succeeding photographs in the serial strip overlap each other by approximately 60%. However, alternate vertical and oblique exposures have been employed to a limited extent to take advantage of the increased area covered through the overlapping pair, which in this case is approximately twice that obtained with vertical serial strip photography, but even with this type of photography there is insufficient overlap between succeeding photographs to effect a tie between stereoscopic models produced from such photographs as would be necessary to bridge between widely spaced ground control points. More recently it has been proposed that serial strip convergent oblique photographs taken with a twin camera installation be employed for mapping. This twin camera installation for taking photographs of the above type which can be used in the usual projectors for producing maps of great accuracy are expensive, due to the complexity of their construction.

Specific reference now may be made to Fig. 1 which, as has been stated above, shows diagrammatically a manner of taking convergent oblique photographs suitable for use in the present invention. In this view, the upper horizontal line designates an imaginary line of flight and direction of flight above a ground line, which is indicated by the lower horizontal line, while the reference letters A, B, and C represent a series of consecutive points of camera exposures along said line of flight over the terrain to be mapped and which is to be covered by a series of pairs of convergent oblique photographs taken with a twin camera installation using wide angle aerial cameras having an angular coverage across the terrain being photographed. As illustrated in Fig. 1, the wide angle aerial cameras employed for making the exposures have an angular coverage across the format of the photograph of about 75 degrees, and each camera is indicated as being tipped respectively forward and backward along the line of flight through an angle of approximately 20 degrees with respect to the vertical. Thus both cameras simultaneously photograph an area extending from a point approximately 17½ degrees to the rear of each point of exposure of the cameras to approximately 17½ degrees forward of each of the said points, for a duplicate coverage of approximately 35 degrees measured in the direction of flight at each exposure point. It is to be understood that these values are illustrative only and that other angular values would be equally satisfactory, the only basic requirement being that there is sufficient common overlap as will be hereinafter explained between the successive forward and rear exposures in each of the cameras in the twin camera installation. With the angular values for camera coverage and tilt given above, the spacing between successive camera exposure points could be as much as 1½ times the flight altitude above the ground. The pairs of convergent oblique photographs taken from successive camera exposure points A, B, and C, Fig. 1, include for each of the said exposure points a forward oblique view delineated by dotted lines as to the limits thereof and a rearward oblique view shown by solid lines. Therefore, from Fig. 1, it will be seen that a forward oblique view taken from an exposure point, such as A, is overlapped by an amount X by a rear oblique view taken from the same exposure point, and that the forward oblique view taken from the first exposure point A is overlapped by the rear oblique view taken from a second exposure point B in an area of terrain common to these two views which overlapping or common area is indicated by the letter Y along the ground line; and the rearward oblique view from the next succeeding (third) exposure point C overlapping the forward oblique view from the preceding point B in a common area designated by the letter "Y" along the ground line, thereby forming a stereoscopic pair of photographs. Also, the forward oblique view from the first exposure point A is shown as having an area portion common to and overlapped by the rearward oblique view from the third exposure station C in an area designated by the letter "Z" along the ground line, this area "Z" being also common to the area in the forward and rearward oblique views from the second exposure point B, this area "Z" also forming a common area of overlap between the two stereoscopic pictures formed by the forward oblique view from the first exposure point A and the rear oblique view from the second exposure point B and the forward oblique view from point B and the rearward oblique view from the third exposure station C, from which stereoscopic pictures two stereoscopic models may be obtained and scaled as will be described hereinafter.

In the practicing of the present invention, developed negatives are obtained from the exposures made in accordance with Fig. 1, and positives are made from such developed negatives. Regardless of the number of exposure points required to cover a desired strip of terrain, the operation of the present invention contemplates the use of only two projector means which correspond to the twin cameras employed in taking the original exposures. The general layout of the equipment is shown schematically in Fig. 2 of the drawings, this view indicating the two projection devices as "projector 1" and "projector 2," respectively, each of which projects a single image of photographed terrain downwardly upon a pair of platen units of a binocular viewing device, also shown diagrammatically on Fig. 2. This viewing device is mounted on a table support having a control sheet of drafting paper thereon for recording the data obtained from the projected photographic images. Each image so projected is composed of photographic compositions which are assembled as will be described hereinafter. The above projectors may be of any conventional type capable of receiving positive prints of the negatives of the views obtained in accordance with Fig. 1, therefore, no detailed description thereof is believed necessary as the construction and operation thereof are well known in the art. Suffice it to say that these projectors are mounted on a supporting bar through a coupling which will permit the projectors to be tipped in a forward or backward manner, tilted to either side, and raised or lowered to a desired position for effecting proper orientation of stereoscopic photographic images projected thereby. In connection with the improved method of bridging control forming a part of the present invention, it may be noted that the stereopontometer is not absolutely necessary to the carrying out of the present improved method of bridging control. However, a high order of precision in the orientation of the forward obliques relative to the rearward obliques is obtained by its use.

The description of the improved bridging stereoscopic registering and viewing device or stereopontometer employed in connection with the present invention will be more readily understood when its function with respect to the novel method of bridging control has been described. Accordingly, the method of bridging control utilizing the said stereopontometer will first be described. From the above-described photographic positives, made from negatives obtained in accordance with Fig. 1, pairs of stereoscopic photographs are made, each pair consisting of the forward oblique photographic positive of one exposure point and the rearward oblique positive of the next succeeding exposure point. In performing this method of bridging control, the forward oblique positives may be placed successively in projector 1 (Fig. 2) and the corresponding rearward oblique positives successively in projector 2 (Fig. 2) beginning with the forward oblique positive taken from exposure point A and the rearward oblique positive taken from exposure point B, which positives have been produced from the developed negatives resulting from the procedure of Fig. 1.

The forward oblique photographic positive taken from exposure point A is positioned within projector 1, and the rearward oblique photographic positive from exposure point B is positioned within projector 2 and the projectors then are oriented by manipulation of the projectors to form a stereoscopic model of the area "Y," Fig. 1, which may be brought to true scale and proper orientation by relative and absolute orientation of the two projectors. After this orientation is accomplished and the data to be obtained therefrom recorded on the control sheet, the forward oblique photograph of station A is removed from projector 1, and the forward oblique photograph of station B is mounted in this projector. Without disturbing the orientation of projector 2 housing the rearward oblique photograph of station B, projector 1 is oriented so that its projection of the area "X," Fig. 1, is common to that in projector 2 and is the exact size and shape on the plane of projection as the projection from the undisturbed projector 2. This orientation will recover the tilt, tip, swing, and height with respect to the projection plane of the forward oblique of the station B, and may be greatly facilitated by use of the photogrammetric stereopontometer hereinafter described; because the common area projected from the projectors will not overlap in their projection, but will be shown on opposite sides of the projected images as is indicated in Fig. 44. Hence the stereopontometer is utilized to literally bring the areas common to the two projections together, permitting a visual determination as to when the objects or pass points disclosed in their common area are of the same size and shape. Accordingly, proper orientation is accomplished when projector 1 is oriented with respect to projector 2 to show the stereoscopic images of the reference marks etched on the image-receiving screens to be in coincidence with the photo-images in all portions of the common coverage. A routine trial and error procedure in manipulating the projector 1 can be used to effect this orientation. After this orientation is made, the rear oblique photograph of station B is removed from projector 2 and the rear oblique photograph of station C is placed in this projector 2 and the latter is oriented relative to projector 1 to form a second stereoscopic model with the forward oblique photograph in projector 1. In this orientation, projector 1 is undisturbed, hence the resultant stereoscopic model is in correct absolute orientation with respect to the datum plane established by the first stereoscopic model. The second stereoscopic model is scaled by adjusting projector 2, housing the rearward oblique of station C, so that the elevation of points in the area "Z," Fig. 1, common to the first stereoscopic model formed by the forward oblique of station A and the rear oblique of station B read the same as they did in the preceding model.

The foregoing procedural steps are summarized by Figs. 42, 43 and 44, taken with the self-explanatory legends on these views, which will be referred to in greater detail hereinafter.

More particularly, either of two procedures may be used to effect the required precise orientation of projector 1 with respect to projector 2 (see Fig. 2) when forward and rear oblique photographs, respectively, at the same exposure point are oriented in the projectors. These procedures are as follows: reference being made particularly to Fig. 2 and also more generally at this time to Figs. 42, 43 and 44 in this connection.

In the first method, the objective is to adjust projector 1 so that the portion of the projection covering the same ground area as that covered by projector 2 is the exact same size and shape as the projection from projector 2. The projection from projector 1 is viewed on platen 1 of the stereopontometer to be described in detail hereinafter, and the projection from projector 2 is viewed on platen 2, each of which has a cross mark etched or engraved on its surface. These platen surfaces may be opaque, in which case they may be viewed from above by the use of suitable viewing equipment designed therefor, or they may be ground glass surfaces, in which case they may be viewed simultaneously from beneath through the binocular system shown diagrammatically in Fig. 44, which embraces the optical system of the stereopontometer forming part of the present invention. When identical images in the two projections coincide simultaneously with the cross marks on the two platens in all portions of the projections common to both when the platens are translated throughout the projections at a fixed separation, projector 1 is oriented properly with respect to projector 2.

To accomplish this, the platens are positioned first near the center of the common area which may be regarded as the first position (position No. 1) and projector 1 is shifted linearly in the transverse direction indicated by the arrow "$bx$" on Fig. 2; and the separation of the platens is adjusted until the same images in each projection coincide with the cross marks. In making this orientation, any want of correspondence in the "$bx$" direction will cause the cross to appear to float above or below the image. In the binocular view, the two crosses fuse to appear as one. Any want of correspondence in a linear longitudinal direction, indicated by the arrow "$by$" in Fig. 2, will cause one leg of the cross to appear to float in space above the other. Then the platens are shifted to the right or left to the extreme edge of the common area along the center line (which may be considered to be the second position or position No. 2) and adjustment of the swing of projector 1 and the separation of the platens is made to obtain coincidence of identical images at this position. A check is made at the first position noted above, and the above steps are repeated until perfect register in the "$by$" direction is obtained along the center line of the common area. The platens then are shifted to the rear of the projection at the center line of the common area which may be regarded as the third position (postion No. 3), and projector 1 is adjusted linearly vertically in the direction indicated by the arrow "$bz$" for obtaining coincidence at this point. The separation of platens is adjusted if necessary. The platens then are shifted to a position near the front side of the projection along the center line of the common area, which is the fourth position (position No. 4), the disparity in direction "$by$" is noted and over-corrected by approximately one-half the amount of disparity of adjusting the tilt of projector 1. The platens are returned to the first position and the entire process is repeated until coincidence is obtained at each of the four positions (positions 1, 2, 3 and 4). The platens then are shifted to one corner of the common projection area, which is the fifth position (position No. 5), and the tip of projector 1 is adjusted to obtain coincidence at this position. This process is repeated until the orientation is found in which perfect register between the image and the cross marks is observed in all positions of the common area at a fixed separation of the platens. When this orientation is found, projector 1 is in proper orientation for proceeding with the triangulation. It will be understood that the terms "tip," "tilt," and "swing" as applied to the projectors are rotary adjustments indicated by curved arrows $a'$, $b'$, and $c'$ on Fig. 2, whereas the positions indicated above as positions 1, 2, 3, 4, and 5 are obtained by linear adjustments of the projectors in horizontal and vertical planes. The five linear positions of adjustments are not shown in the drawings.

The second method for properly orienting the projectors can be applied even when the area common to both exposures is small. In this method, the separation of the projectors and the image-receiving platforms are made identical and the separation of the platens is not altered in the orientation process. After setting the projector and platen separation, the platens are positioned near the center of the common area, which is the first position noted above (position No. 1), and projector 1 is adjusted in linear direction "$by$" and rotated for "tip" to obtain coincidence in linear directions "$by$" and "$bx$," respectively. The platens then are shifted to the rear of the common area at the center line, which is the second position as noted above (position No. 2), and projector 1 is adjusted in the vertical linear direction "$bz$" and rotatably for "swing" to obtain coincidence at this position. The platens then are shifted to the front side of the projections at the center line, this being the third position (position No. 3), as above, and the want of correspondence in direction "$by$" is noted and over-corrected by approximately one-half the amount of disparity. The entire process is repeated until exact register is obtained at all three positions. Projector 1 then is in proper orientation to proceed with the triangulation.

With convergent oblique serial strip photography, to which the present invention relates, the orientation of the left hand projector of the two-projector instrument which is employed in carrying out the present invention is accomplished with the forward oblique and rearward oblique photographs of the same station in the left and right hand projectors, respectively, and the orientation of the left hand projector when accomplished in no way corresponds to the orientation of the right hand projector. It may be noted also that orientation with vertical serial strip photography can be accomplished with the present invention if identical slides are placed in both projectors, and in this respect the present invention is applicable to photogrammetric triangulation with vertical serial strip photography as well as with convergent oblique serial strip photography in a two-projector instrument.

Referring specifically to the stereopontometer included in the present invention, it may be said to include a stereoscope having a binocular viewing device operatively mounted between a pair of longitudinally adjustable vertically disposed image-receiving screen units or platen units supported in space by a carriage slidably mounted upon a longitudinal track of a second carriage along which it may be moved to provide longitudinal movement to the stereoscope. The second carriage is provided with rollers which ride upon a lateral track provided therefor in a base support along which the second carriage may be moved to provide lateral movement to the stereoscope. The above movements are provided for moving the stereoscope into a position under a pair of projected images where the platen units may be adjusted longitudinally to receive the said projected images for stereoscopic viewing through the stereoscope as has previously been described.

For a detailed description of the stereopontometer, reference is made to the accompanying drawings, Figs. 2a through 41, inclusive. Fig. 2a shows a perspective of the present improved stereopontometer. This instrument includes a base support comprising a pair of spaced longitudinal parallel bars 10, Figs. 2a and 3, which bars support at their ends a pair of transverse parallel angle irons 12 and 14 vertically spaced from the said bars by spacer plates 16. The transverse angle iron 12 carries a bar track 18, Figs. 2a, 3, 4, and 5 adjacent to the upper edge of its vertical flange and spaced therefrom by a plurality of spacer members 20. The track 18 provides vertical support for the right side of the second carriage having a roller support 22, hereinafter described, riding on the said track. The remaining transverse angle iron 14 has a pair of plates 24, Figs. 35, 36, and 37 welded to its ends having passages adjacent to their upper ends through which supporting plugs 26 pass into the ends of a tubular track 28. The plugs 26 are provided with flanges having a plurality of passages through which a corresponding plurality of fastening members 30 may pass into a corresponding plurality of threaded passages of the plates 24 to secure the plugs to the said plates. The tubular track 28 provides vertical support for the left side of the second carriage including a roller support 32 riding on the said tubular track.

The roller support 32, Figs. 2a and 3, is secured to a carriage frame 70 of the second carriage by a plurality of screws 34, Figs. 4 and 5, and includes a plurality of upper and lower rollers 36 having their outer peripheries grooved to fit portions of the track 28. To prevent any play between the rollers 36 and the track 28, the rollers are mounted within eccentrics which as shown in Figs. 25 and 26 consist of eccentric sleeves 38 rotatably seated within the roller support 32 adjacent to passages 40 housing pairs of locking members 42, one of which is threaded to screws 44 and coacts with the other to provide locking means which, when tightened together, engages the eccentric sleeves 38 locking same in a desired position.

To lock the second carriage in a desired position along its tracks 28 and 18 the roller support 32, Fig. 27, has a locking member 46 having a vertical end flange 48 on one end resting on the roller support 32 adjacent to the forward upper roller of the rollers 36 and its opposite end extending over the said roller. The locking member is secured in this position by a screw 50 threadedly received in the support 32 which acts to depress the end of the locking member into locking engagement with the said roller.

The roller support, Fig. 2a, of the second carriage 22 is secured to the right end of the carriage frame 70 by a plurality of screws 52 and includes a pair of rollers 54 which ride along the track 18. The rollers 54, Figs. 33 and 34, are eccentrically mounted adjacent to the ends of the support 22 in eccentrics including eccentric sleeves 55 and locking means 57 similar in construction to those described for the rollers 36 of the roller support 32. The support 22 has a depending web 56 from which an outwardly extending flange 58 extends to support a roller support bearing block 60 secured to the said flange by screws 62 for vertically securing the right end of the first carriage securely to the track 18.

The carriage frame 70, Figs. 2a and 4, of the second carriage extends between the carriage roller supports 22 and 32 and includes a horizontal member 72, Fig. 9, having at one side a depending flange 74 and at its opposite side a downwardly and upwardly extending flange 76. The upwardly extending portion of flange 76 is provided on its inner side with a channel 78, the purpose of which will be described hereinafter. The horizontal member 72 of the frame member supports a detachable flange member 80 extending upwardly of the horizontal member to a position corresponding to the upwardly extending flange portion of flange 76 where it is provided with a channel 82 corresponding to channel 78. Closing the ends of the channels 82 and 78 are a plurality of plates 84, Fig. 21, secured to the frame 70 by screws 86 which support rods 88 so disposed with respect to the said plates as to fit within the channels to furnish tracks for that portion of a plurality of ball bearings 90 extending within said channels. The remaining portions of the ball bearings 90 extend within corresponding channels 78' and 82' of a first carriage frame 92 having secured at each end plates 84' carrying corresponding rods 88' which coact with rods 88 to form a roller bearing support for the first carriage along the frame of the second carriage. The roller bearings 90 are spaced along the frame 92 by a spacer member 94 which as shown in Fig. 11, consists of a thin plastic plate having a plurality of spaced passages through which the ball bearings pass. The first carriage frame 92 is provided with locking means whereby it may be locked in any desired position along the second carriage. Such locking means comprise braking shoes 100 secured to a shoe supporting member 102 by screws 104. This shoe supporting member is provided with top and bottom wells 106 separated by a web 108 having a passage through which a reduced portion of rod 110 passes. The rod 110 has at its lower end a threaded passage to receive a screw and washer 112 located within the lower well 106 and carries on its reduced portion a helical spring 114 abutting the web 108 and shoulder 116 of the rod 110. The rod 110 is provided with threads 118 adjacent to its reduced portion which are threadedly received through a correspondingly threaded passage 120 provided therefor in frame 92 and has at its upper end a knurled knob 122 by means of which the rod 110 may be turned to compress the helical spring forcing the braking shoes 100 against the frame 70 of the second carriage.

Figure 10:
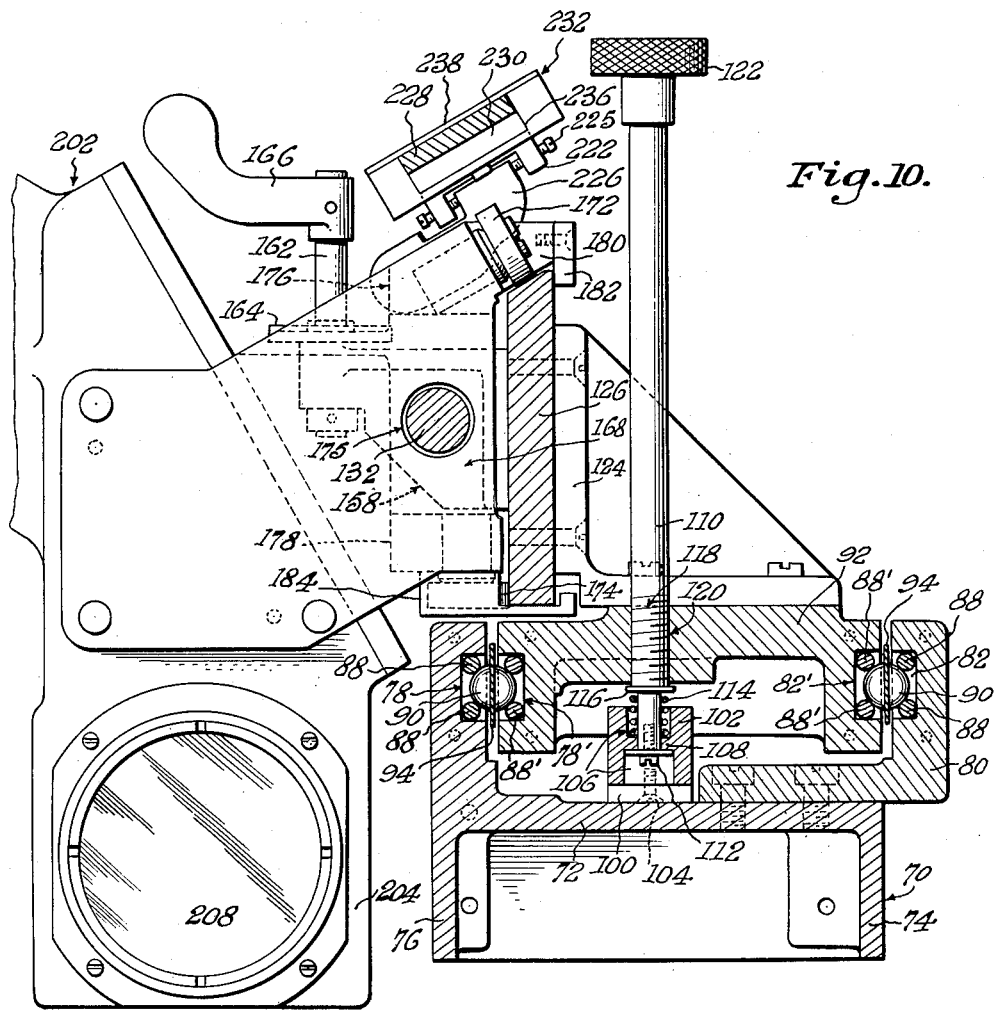
Fig. 10 is a vertical transverse sectional view of the stereopontometer taken along line 10—10 of Figs. 2a and 8.
Figure 21:
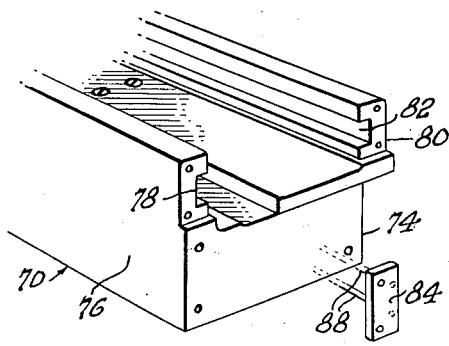
Fig. 21 is a detailed perspective view of one end of the main supporting frame, showing the ball bearing supporting rod plates removed.
Figure 22:
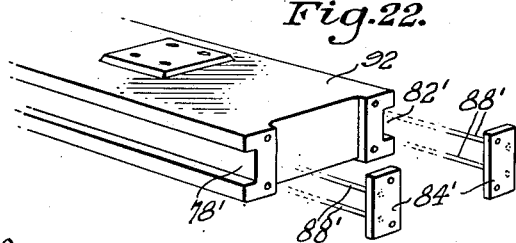
Fig. 22 is a perspective view of one end of the stereoscope supporting frame.

The first carriage frame 92 carries a plurality of right angle brackets 124, Figs. 3–8, 9 and 10, to which is secured a flat bar 126 having a beveled upper edge also shown in Figs. 9 and 10. The bar 126 has a pair of bearing brackets 128, Figs. 3–8, 9 and 10, secured adjacent to its ends by screws 130 for positioning in space a rod 132 having left hand threads 134 adjacent to one end and right hand threads 136 adjacent to its other end. The right end of the rod is provided with a knurled head 138 for a purpose hereinafter described. The threaded portions 134 and 136 of the rod 132 pass through nuts 140 secured to a pair of image-receiving screens on platen brackets 142 by studs 144 extending from the said brackets. The studs 144 fit within recesses 146 provided therefor in the nuts 140 which are separated from second recesses 148 by thin partitions 150 and are secured in the recesses 146 by screws 152 passing through passages 154 of the nuts 140 through the recesses 148 against the partitions 150 forcing them against the studs 144 thereby taking out any lateral play which may exist between the stud and recess walls. To provide for any vertical play which may exist between the nuts 140 and brackets, they are interconnected by a spring 156 under tension.

A brackets 158, Figs. 11, 12 and 13, is secured to the bar 126 intermediate its ends by screws 160 and supports a pin 162 having a disc 164 secured intermediate its ends above the said supporting bracket and crank 166 secured to its upper end. A pair of binocular eyepiece supporting brackets 168, Figs. 2a and 8, are mounted upon the bar 126 on each side of the bracket 158 and are provided with webs 171 connected to the disc 164 through a pair of links 170 as shown in Figs. 3 and 8. It is with this arrangement that the eyepiece supporting brackets 168 may be spaced by turning the crank 166 for adjusting eyepieces connected to said brackets. The eyepiece supporting brackets 168 and the platen unit supporting brackets 142, Fig. 14, are similar in construction and are mounted upon the bar 126 through a plurality of friction rollers 172 riding upon the beveled portion of the bar 126 and lower rollers 174 riding against the said bar. The rollers 172 and 174 are eccentrically mounted within upper and lower flanges 176 and 178 respectively of the brackets 168 and 142, the said eccentrics including eccentric sleeves 177 and locking means 179 similar in construction to those previously described for the rollers 36 of the roller support 32. The upper flanges 176 of the brackets have horizontal extensions 180 which extend over the bar 126 and have detachable depending flanges 182 which frictionally engage the back side of the bar 126 compensate for any clockwise moment which may be imparted to the said brackets by the platen units and binoculars supported by the said brackets. The lower flanges 178 of these brackets are also provided with retaining flanges 184 which are adapted to engage the bar 126 should a counterclockwise movement be imparted to the brackets which would tend to knock the brackets off the bar. The brackets are provided with openings 175 intermediate the flanges 176 and 178 through which the rod 132 passes.

Secured to the platen unit brackets 142 are platen units 190, Figs. 2a, 9 and 41, comprising image receiving screens 192 made of glass or other suitable material having one side ground and provided with suitable reference marks 194, which as shown in Figs. 2a and 3, consists of crossed lines etched or engraved on the image-receiving screens. The image-receiving screens 192 are carried in the upper ends of the platen unit housings 196, Fig. 41, which house at their lower ends mirrors 198 adapted to reflect the image of the image-receiving screens through lenses 200, mounted within the housings 196 adjacent to the binocular eyepieces, through corresponding lenses 208 to mirrors 206 of binocular eyepieces 202 carried by the eyepiece brackets 168.

The binocular eyepieces 202, Figs. 2a, 3, 38 and 39 include housings 204 having the lenses 208 mounted in their sides facing the lenses 200 of the platen units 190 and the mirrors 206 which are so positioned within the said housings 204 as to direct the image of the platen unit screens upwardly to second mirrors 211 which are carried adjacent to the upper end of said housings and which are adapted to reflect the images through telescopic eyepiece tubes 210 carried by the housings 204 containing lenses 212 mounted in the lower ends of the eyepiece tubes and eyepieces 214 mounted in their upper ends for binocular viewing of said images.

To accurately determine the distance between the platen units, the stereopontometer is provided with a scale 220, Figs. 2a, 8 and 16. The said scale 220 comprises an upper bar 228 and a complementary lower bar 230, having brackets 222 secured to their outer ends by screws 224. The brackets 222 are adapted to be received by brackets 226 and are secured thereto by fasteners 225. The brackets 226 are carried by the platen unit supporting brackets 142 and are secured to the said supporting brackets 142 by suitable fasteners. The bar 230 has secured to its lower side adjacent to its end opposite the end carrying the bracket 222 a guide member 232 which includes an elongated channel member 236, Fig. 20, having a pair of spaced retaining plates 238 secured to the flanges of said channel member by fasteners 240, and a vernier 242 secured by fasteners 244 to one flange of said channel member intermediate the plates 238 and in operable association with suitable scale graduations 246 etched or engraved on bar 228. The bars 228 and 230 pass through the guide member 232 in an overlapping manner in view of their connection to the platen unit carriages are adjustable responsive to the adjustment of the platen units carried by the platen brackets 142 by actuation of the rod 132. The scale graduations are so disposed upon the bar 230 that the distance between the platen units may be readily determined by referring to the vernier 242.

Figs. 42, 43 and 44 indicate diagrammatically the obtaining of the stereoscopic models from the exposures taken from the successive exposure points A, B and C in accordance with the showing of Fig. 1 with the projection equipment and viewing device shown diagrammatically in Fig. 2, as aforesaid.

The films or plates thus exposed at the successive exposure points are developed, and positives, either transparent or opaque, dependent upon the particular construction of the projectors, are made from the resulting negatives. In Figs. 42, 43 and 44 reference indicia 1F, 2F, 3F are employed to identify the positives made from the forwardly directed negatives from the exposure points A, B and C of Fig. 1, such being forward positives of the respective stations. Similarly, 2R and 3R are rearward positives made from the negatives of the rearwardly-directed cameras at stations B and C. The line B corresponds to the distance between the successive exposure points, and H indicates the height or altitude above the ground line at which the pictures were made.

The control bridging for producing the stereoscopic models is accomplished in the following manner, as has been set forth previously herein, the following summarizing sequentially the foregoing described procedure, but with particular reference to Figs. 42, 43, and 44. First, the first stereoscopic pair of photographs of a serial strip consisting of the forward oblique photograph 1F from the first exposure point, "A" of Fig. 1, and the rear oblique photograph 2R from the second exposure point, "B," are oriented in the pair of tipped projectors (Fig. 2), forming a stereoscopic spatial model 1F—2R (Fig. 43, step 1), which may be brought to true scale and proper orientation of the two projectors.

After this orientation is accomplished, the forward oblique photograph 1F from exposure point A is removed from projector No. 1 and the forward oblique photograph 2F from exposure point B is mounted in this projector as is indicated on Fig. 44. Without disturbing the orientation of projector No. 2, projector No. 1 is oriented with respect thereto so that its projection in the area that is common to that projected from projector No. 2, is the exact size and shape on the plane of projection as the projection from the undisturbed projector No. 2, thus giving the condition illustrated by Fig. 44, the two separately projected images being brought into exact coincidence with each other and with the markings on the image-receiving platens of the stereopontometer viewing device of Fig. 2, and as indicated by the bottom line marked D on Fig. 44, this coincident image being designated on Fig. 44 as stereopontometer model 2F—2R and it shows proper adjustment or orientation of projector No. 1 relative to projector No. 2. This orientation is summarized by the legends under step II, Fig. 44, and it recovers the tilt, tip, swing, and height with respect to the projection plane of the forward oblique photograph 2F of the second station (station B of Fig. 1).

After this orientation is made, the rear oblique photograph 2R from exposure point B is removed from projector No. 2, and the rear oblique photograph 3R from exposure point C is oriented in this projector No. 2 to form a stereoscopic model with the forward oblique photograph 2F in projector No. 1. In this orientation, projector No. 1 is undisturbed, hence the resultant stereoscopic model 2F—3R of Fig. 42 is in correct absolute orientation with the datum plane established by the first stereoscopic model 1F—2R. This second stereoscopic model 2F—3R is scaled by adjusting projector No. 2 so that the elevation of a point in the area common to this stereoscopic model 2F—3R and the preceding stereoscopic model (model 1F—2R) formed by the forward oblique photograph 1F of station A and the rear oblique photograph 2R of station B reads the same as it did in the preceding model.

The formation of the second stereoscopic model 2F—2R is summarized by the legends under the caption step III on Fig. 44 of the drawings.

It will be understood that while the bridging procedure of the present invention is described in connection with the three successive exposure points, A, B, and C, as many such exposure points as may be necessary to cover a given strip of terrain may be employed, there being, however, sufficient common overlapping area between successive observation stations for carrying out the bridging procedure herein outlined.

The apparatus herein describd for viewing the stereoscopic models obtained by the above-described orientation of the projectors comprises a cross slide system supporting two image-receiving platforms separated at a distance equal to the separation of the projectors, as indicated by equal lines D in Fig. 44, and a binocular viewing attachment. The separation of the image-receiving platforms is adjustable and each platform has an engraved dot, cross, or other suitable reference mark. Both image-receiving screens are translatable together in the bx and by directions of Fig. 2 on the cross slide so that the operator can scan the projected images. The viewing system permits simultaneous binocular viewing of the projected images from each projector and the reference marks on each of the image-receiving platforms. When projector No. 1 is properly oriented with respect to projector No. 2, the stereoscopic image of the reference marks will appear to be in coincidence with the photo-image in all portions of the common coverage. The binocular viewing obtained by the present device enlarges the photo-images sufficiently for accurate visual comparison, a fact which is of importance particularly since the projected photo-images are from diapositives produced through the use of a reduction printer. Obviously, instead of transparent diapositives, opaque positives are employed in such projectors as employ reflecting optical systems.

It will be understood further that when the two projectors have been oriented properly they occupy the same positions relative to each other as the cameras occupied in making the exposures described in connection with Fig. 1. Therefore, Fig. 44 which represents the obtaining of stereoscopic models from properly oriented projectors substantially duplicates the camera relationships shown in Fig. 1, and in Fig. 42 the vertical line H corresponds to the altitude of the line of flight above the ground line, and the distance B between the two projectors corresponds to the distance between the exposure points. The datum plane established by each stereoscopic model in Fig. 42 defines the straight line or base to which the vertical line H is dropped, which corresponds to the ground line of Fig. 1. This vertical line H in Fig. 42 actually is the distance of the height of the projector lens above this plane, and corresponds to the altitude or height of the line of flight of Fig. 1 as has been mentioned above.

In Figs. 42, 43 and 44, it will be understood that of the two projectors employed, either one will be a forwardly directed projector corresponding to the forwardly directed camera employed in Fig. 1, and the other will be the rearwardly directed projector corresponding to the rearwardly directed camera. While in the present description projector 1 of Fig. 2 corresponds to the forward projector of Figs. 42, 43 and 44, and projector No. 2 of Fig. 2 corresponds to the rear projector of Figs. 42, 43, and 44, this may be reversed in considering Fig. 2, so long as the same projector is employed continuously in this relationship throughout the procedure. It will be clear also that the numerals 1, 2 and 3 as employed in Figs. 42, 43, and 44 correspond to successive exposure points A, B, and C, respectively, of Fig. 1 at which the original exposures have been taken.

An alternate method of orienting the forward oblique with respect to the rearward oblique of the same station using the viewing device herein illustrated and described can be accomplished by setting the separation of the image-receiving platforms exactly equal to the separation of the emergent nodes of the two projectors by means of precalibrated scales on the projector support and the carriage for the image-receiving platforms, then adjusting the position, tip, tilt and swing of projector 1 to obtain apparent stereoscopic coincidence of the fused reference mark with the photo-image. By stereoscopic observation of the register of the image from one projector with respect to the other a higher order of precision is possible than would be obtained by monocular observation with respect to a reference point, although the registration could be accomplished monocularly if reduced precision as acceptable.

After the absolute orientation second stereoscopic model has been accomplished by this procedure, the control sheet is moved forward and oriented in register with the positions of features along the left side of the stereoscopic model which were previously established in the first model of the strip. This second model is then correctly oriented over the control sheet and positions of additional points within the overlap may be established and their elevations may be measured and recorded as is usually done in stereo-photogrammatic instruments.

This above-described procedure may be repeated for additional pairs for as long an extension as desired. If additional ground surveyed control is available at some point along the strip, the error of closure on this control is measured and the error is distributed along the strip to establish adjusted positions and elevations.

The present invention provides a means for precise photogrammetric triangulation in a stereoscopic plotting instrument using convergent oblique photography, and it does not depend on mechanical adjustment for the precision of the triangulation. The triangulation is accomplished in a two projector instrument and does not require a bank of instruments as in other known devices for this purpose. Consequently, the present equipment is less expensive and the precision of triangulation with the present procedure and device will be of a higher order than with the usual vertical strip photography and with other known devices which use convergent oblique photography.

Having thus described my invention, what I claim as new and wish to secure by Letters Patent is:

1. A method of aerial photogrammetry with serial strip convergent oblique photography, which comprises taking two aerial photographic exposures at a series of spaced exposure stations with a double camera having two lenses; one of which lenses having its optical axis tilted forwardly in the line of flight, the other of which lenses having its optical axis tilted rearwardly in the line of flight, exposure of a photographic medium being effected simultaneously and substantially instantaneously through both lenses at each station with the photographic medium fixed in position with respect to both lenses during each exposure, one of which exposures is a forward exposure, the other of which is a rear exposure, the exposures at each station providing a common overlapping area between each successive station, and effecting a bridging control between a forward oblique photograph and a rearward oblique photograph obtained from the said exposures taken at each of the stations, the said photographs having a common overlap of the area photographed at the succeeding spaced exposure stations along a strip of topography, the said bridging control being effected by a method comprising selecting stereoscopic pairs of photographs covering the strip of topography, the resulting selected stereoscopic pairs of photographs including a forward oblique photograph from one exposure station and a rearward oblique photograph of the next succeeding exposure station covering approximately the same topography, orienting a first pair of said stereoscopic photographs into a pair of projectors in which the forward oblique from the first exposure station is positioned in a first projector of said pair, and the rearward oblique from the succeeding exposure station in the second projector of the said pair, relatively and absolutely orienting the said projectors to form a first stereoscopic spatial model in true scale and proper orientation; removing the said forward oblique photograph from the first exposure station from its projector, mounting the forward oblique photograph taken from the next succeeding exposure station in this same projector, orienting this same projector relative to the second projector of the pair until the projections of the areas common to the photographs in the said projectors become the same size and shape on the plane of projection as the projection of the oblique photograph from the second projector of the said pair to its undisturbed orientation; removing the rear oblique photograph taken from the said succeeding exposure station from the second projector, mounting the rear oblique photograph from a third succeeding exposure station in the said second projector to form a second stereoscopic pair of photographs with the forward oblique photograph in the first of said projectors, orienting the said second projector relative to the first until there is obtained a second stereoscopic model in correct absolute orientation relative to a datum plane established by the first stereoscopic model, and continuing the method as above until the entire strip of topography has been run.

2. A method of aerial photogrammetry employing serial strip convergent oblique photography, which comprises making two aerial photographic exposures at a series of spaced exposure stations with a double camera having two lenses, one of which lenses having its optical axis tilted forwardly in the line of flight; the other of which lenses having its optical axis tilted rearwardly in the line of flight, exposure of a photographic medium being effected simultaneously and substantially instantaneously through both lenses at each station with the photographic medium fixed in position with respect to both lenses during each exposure, one of which exposures is a forward oblique exposure, the other of which is a rear oblique exposure, the exposures at each station providing a common overlapping area between each successive station, and effecting a bridging control between a forward oblique photograph and a rearward oblique photograph obtained from the said exposures taken at each of the stations, the said photographs having a common overlap of the area photographed at succeeding stations along a strip of topography, the said bridging control being effected by a method which comprises orienting in a pair of tipped projectors forming a stereoscopic spatial model of a first stereoscopic pair of photographs of a serial strip consisting of the forward oblique photograph of the first station and the rear oblique photograph of the second station, bringing the said stereoscopic spatial model to true scale and proper orientation by relative and absolute orientation of the two projectors, then removing the forward oblique photograph of the first station from the first projector of the pair, mounting the forward oblique photograph of the second station in this first projector, then without disturbing the orientation of the second projector of the pair, orienting the first projector so that its projection in areas that is common to that projected in the second projector is the exact size and shape on the plane of projection as is the projection from the undisturbed second projector and is brought into visual registry therewith, this orientation of the first projector recovering the tilt, tip, swing, and height with respect to the projection plane of the forward oblique photograph of the second station, then after completing this orientation, removing the rear oblique photograph of the second station from the second projector, orienting the rear oblique photograph of the third station in the second projector to form a second stereoscopic model with the forward oblique photograph in the first projector while maintaining the first projector undisturbed, the resultant stereoscopic model being in correct absolute orientation with respect to a datum plane established by the first-mentioned stereoscopic model, and scaling this last-mentioned model by adjusting the second projector so that the elevation of a point in the area common to this last-mentioned stereoscopic model and the first-mentioned stereoscopic model formed by the forward oblique photograph of the first station and the rear oblique photograph of the second station reads the same as in the first-mentioned model.

3. In aerotriangulation with convergent photography, the method of bridging control between convergent oblique photographs of a series of observation stations spaced along a line of flight, which comprises taking forward and rear oblique photographs of each station with a dual aerial camera installation, one of the cameras of which is directed forwardly and the other camera being directed rearwardly with respect to the line of flight and each station being photographed, exposure of a photographic medium in both cameras being effected simultaneously and substantially instantaneously in both cameras at each station with the photographic medium fixed in position with respect to both cameras during each exposure, the stations being selected having a spacing such that the resulting photographs have substantial overlapping areas, the forward photograph of the first station including a ground control with known pass points, producing a succession of stereoscopic models of the overlapping areas of the photographs of the stations with a pair of projectors, one of which projectors is a forward projector, the other of which projectors is a rear projector, orienting the projectors of the pair relatively and absolutely with respect to each other in the same relationship as were the aerial cameras of the dual camera installation by adjusting both projectors until they project a first stereoscopic model composed of the overlapping areas of the forward photograph of the first station and the rear photograph of the second station, the forward photograph of the first station being in the forward projector and the rear photograph of the second station being in the rear projector, further orienting the projectors until the resulting first stereoscopic model is oriented with the ground control in the forward photograph of the first station, replacing the forward photograph of the first station in the forward projector with the forward photograph of the second station while maintaining unchanged the orientation of the rear projector, adjusting the forward projector relative to the rear projector until the projectors are again oriented, replacing the rear photograph of the second station in the rear projector with the rear photograph of the third station while maintaining the adjustment of the forward projector, adjusting the rear projector relative to the forward projector until there is obtained a second stereoscopic model of the overlapping area of the forward photograph of the second station and the rear photograph of the third station, and scaling the said second stereoscopic model to the pass points in the first stereoscopic model.

4. In aerotriangulation with convergent photography, the method of bridging control between convergent oblique photographs of a series of observation stations spaced along a line of flight, which comprises taking forward and rear oblique photographs of each station with a dual aerial camera installation, one of the cameras of which is directed forwardly and the other camera is directed rearwardly with respect to the line of flight and each station being photographed, exposure of a photographic medium in both cameras being effected simultaneously and substantially instantaneously in both cameras at each station with the photographic medium fixed in position with respect to both cameras during each exposure, the stations being selected being spaced so that the resulting photographs have substantial overlapping areas, the forward photograph of the first station including a ground control with known pass points, producing a succession of stereoscopic models of the overlapping areas of the photographs of the stations with a pair of projectors, one of which projectors is a forward projector, the other of which projectors is a rear projector, orienting the projectors of the pair relatively and absolutely with respect to each other in the same relationship as were the aerial cameras of the dual camera installation, by adjusting both projectors until they project a first stereoscopic model composed of the overlapping area of the forward photograph of the first station and the rear photograph of the second station, the forward photograph of the first station being in the forward projector and the rear photograph of the second station being in the rear projector, further orienting the projectors until the resulting first stereoscopic model is oriented with the ground control and pass points included therein, replacing the forward photograph of the first station in the forward projector with the forward photograph of the second station while maintaining unchanged the orientation of the rear projector, adjusting the forward projector relative to the rear projector until separate images from the projectors become equal in dimension and areas and are brought into visual coincidence, replacing the rear photograph of the second station in the rear projector with the rear photograph of the third station while maintaining the adjustment of the forward projector, adjusting the rear projector relative to the forward projector until there is obtained a second stereoscopic model of the overlapping area of the forward photograph of the second station and the rear photograph of the third station, scaling this stereoscopic model to the pass points in the first stereoscopic model, and similarly obtaining and orienting remaining stereoscopic models of overlapping areas of forward and rear photographs of succeeding stations on an entire strip of topography.

5. The process of bridging control between convergent oblique photographs of a series of spaced exposure stations along a line of flight, as claimed in claim 4, wherein stereoscopic models of overlapping areas of a forward photograph of one of the stations and a rear photograph of the succeeding station are obtained by orienting the projectors relatively to each other by placing successively in the same projector of the pair the forward oblique photographs of each successive station and placing successively in the other projector of the pair the rear oblique photographs of each successive station, and adjusting the projectors relatively to each other until a series of stereoscopic models of the said successive overlapping areas is obtained.

6. The process of bridging control between convergent oblique photographs made from a series of spaced exposure stations along a line of flight, as claimed in claim 4, wherein stereoscopic models of overlapping areas of a forward oblique photograph of one of the stations and a rear oblique photograph of the succeeding station are obtained by placing successively in the same projector of the pair the forward photographs of each successive station and placing successively in the other projector of the pair the rear photographs of each successive station and alternately orienting each projector of the pair with respect to the other projector until a series of stereoscopic models of the said successive overlapping areas is obtained.

7. A method of aerial photogrammetry as claimed in claim 1 wherein the bridging of the rearward converging oblique photograph contained in the first projector and the forward converging oblique photograph contained in the second projector is accomplished by simultaneously viewing separate projections of the said photographs through binocular stereoscopic viewing means which provide simultaneous binocular viewing of the projected images from each projector and a reference mark on each of image receiving platforms of the viewing means, and adjusting the said viewing means until a stereoscopic image of the reference marks appears to be in coincidence with the resulting photo-image in all portions of common coverage.

8. A method of aerial photogrammetry as claimed in claim 1 wherein the bridging of the rearward converging oblique photograph contained in the first projector and the forward converging oblique photograph contained in the second projector, the said photographs being taken at successive exposure stations with sufficient common overlap for bridging, is accomplished by viewing the said photographs through stereoscopic viewing means, adjusting the means until reference marks on image-receiving platforms thereof are separated in an amount exactly equal to the separation of the emergent nodes of the two projectors, and then adjusting the first projector relative to the second projector for tip, tilt, and swing until the projectors duplicate such positions of the pair of aerial cameras to obtain apparent stereoscopic coincidence of the resulting fused reference mark with the photo-image.

9. A stereoscopic registering and viewing device for effecting a method of bridging control as claimed in claim 8, comprising, in combination, a base means, a first carriage mounted upon the base means, a second carriage mounted upon the first carriage, and a stereoscope of the type having image receiving screens for receiving projected images for viewing through binocular viewing means mounted upon the second carriage, the said base means comprising a pair of longitudinally spaced parallel bars interconnected by a pair of laterally spaced parallel angle irons supporting a pair of tracks along which the first carriage may move.

10. A stereoscopic registering and viewing device for effecting a method of bridging control as claimed in Claim 8, comprising, in combination, a base means, a first carriage mounted upon the base means, a second carriage mounted upon the first carriage, and a stereoscope carried by the second carriage of the type having adjustable image receiving screens for receiving projected images for viewing through binocular viewing means, the said first carriage comprising a longitudinal frame member, a pair of roller supports, the said roller supports secured to the ends of the same frame member and adapting the said first carriage for lateral movement along the base means.

11. A stereoscopic registering and viewing device for effecting a method of bridging control as claimed in claim 8, comprising, in combination, a base means, a first carriage mounted upon the base means, a second carriage mounted upon the first carriage, and a stereoscope carried by the second carriage of the type having adjustable image receiving screens for receiving projected images for viewing through binocular viewing means, the said second carriage comprising a longitudinal frame member slidably mounted upon the first carriage, a plurality of brackets mounted in the said frame, a bar, the said bar mounted upon the said brackets and adapted to support the said stereoscope, the said frame being slidably mounted on the first carriage to provide longitudinal movement to the stereoscope.

12. A stereoscopic registering and viewing device for effecting a method of bridging control as claimed in claim 8, comprising, in combination, a base means, a first carriage mounted upon the base means, a second carriage mounted upon the first carriage, and a stereoscope mounted upon the first carriage, the said stereoscope comprising a pair of platen units, means including a rod for adjusting the platen units, the said pair of platen units being adjustably mounted upon the rod, and including image-receiving screens having reference marks etched on said screens, together with mirrors and housings therefor, the said housings housing the said screens mounted in the top thereof, the mirrors being disposed within the housings for reflecting images of the said screens inwardly, a binocular viewing means including a plurality of mirrors, eye-pieces, and a housing housing said mirrors and eye-pieces, the said mirrors being adapted to receive the reflected images of the image-receiving screens and reflect same through the said eye-pieces.

13. A stereoscopic registering and viewing device for effecting a method of bridging control as claimed in claim 8, comprising, in combination, a base means including a pair of laterally spaced parallel track members, a first carriage including a longitudinal frame member and a pair of roller supports, the said roller supports being secured to the end of the said frame member and adapted to roll laterally along the said base track members, a locking means for locking the first carriage in a selected position along said base tracks, a second carriage including a second longitudinal frame, roller bearings interconnecting the second longitudinal frame to the first-mentioned longitudinal frame and providing means whereby the said second frame may slide longitudinally along the said first-mentioned frame, second locking means for locking the second carriage in a selected position relative to the said first carriage, a bar mounted on the second frame and carried in an upright position by the said second frame, and a stereoscope mounted upon the said bar, the said stereoscope including a pair of platen units, viewing means intermediate said platen units, a rod connected to the said bar and having left hand threads at one end and right hand threads at its opposite end, the said platen units being adjustably mounted on the threaded portions of said rod and including image receiving screens, mirrors, lenses and housings, the said housings having the image-receiving screens set in their top sides and the mirrors set adjacent to their bottom sides and positioned to reflect images of the image-receiving screens through lenses mounted in the sides of the said housings to the image-viewing means, the said image-viewing means including additional lenses, mirrors, eye-pieces and housings, the latter housings having the additional lenses mounted in their sides through which the reflected images of the image-receiving screens pass to the additional mirrors housed within the latter housings and positioned to receive the said reflected images and to reflect the same upwardly through the said eye-pieces for viewing.

14. A stereoscopic registering and viewing device for effecting a method of bridging control as claimed in claim 8, comprising, in combination, a base, a first carriage mounted on the base so that it may be laterally transported in one direction, a second carriage mounted on the first carriage and provided with binocular viewing means and separable image-receiving screens, the second carriage being so mounted on the first carriage that it may be transported laterally in a direction normal to the direction of movement of the first carriage, and means for adjusting amounts of separation of the image-receiving screens.

References Cited in the file of this patent

UNITED STATES PATENTS

| | | |
|---|---|---|
| 1,467,163 | Hugershoff | Sept. 4, 1923 |
| 1,478,693 | Bauersfeld | Dec. 25, 1923 |
| 1,673,680 | Hugershoff | June 12, 1928 |
| 1,756,062 | Holst | Apr. 29, 1930 |
| 1,793,217 | Fourcade | Feb. 17, 1931 |
| 1,858,353 | Aldis | May 17, 1932 |
| 1,910,425 | Cahill | May 23, 1933 |
| 1,955,116 | Duchatellier | Apr. 17, 1934 |
| 1,980,657 | Bauersfeld | Nov. 13, 1934 |
| 1,980,981 | Cooke | Nov. 20, 1934 |
| 2,200,594 | Diggins | May 14, 1940 |
| 2,387,555 | Bauersfeld | Oct. 23, 1945 |
| 2,433,534 | Sonne | Dec. 30, 1947 |
| 2,461,567 | Pennington | Feb. 15, 1949 |
| 2,647,317 | Poivilliers | Aug. 4, 1953 |
| 2,696,752 | Bean | Dec. 14, 1954 |

OTHER REFERENCES

U. S. Geological Survey Circular No. 222 of 1952, pages 2–6 cited.